United States Patent
Du et al.

(10) Patent No.: US 11,334,329 B2
(45) Date of Patent: May 17, 2022

(54) GENERAL MACHINE LEARNING MODEL, AND MODEL FILE GENERATION AND PARSING METHOD

(71) Applicant: Shanghai Cambricon Information Technology Co., Ltd., Pudong New Area (CN)

(72) Inventors: Weijian Du, Pudong New Area (CN); Linyang Wu, Pudong New Area (CN); Xunyu Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 5 days.

(21) Appl. No.: 16/975,082

(22) PCT Filed: May 7, 2019

(86) PCT No.: PCT/CN2019/085853
§ 371 (c)(1),
(2) Date: Aug. 21, 2020

(87) PCT Pub. No.: WO2019/233231
PCT Pub. Date: Dec. 12, 2019

(65) Prior Publication Data
US 2021/0089285 A1  Mar. 25, 2021

(30) Foreign Application Priority Data

Jun. 8, 2018 (CN) .......................... 201810588623.3
Jun. 8, 2018 (CN) .......................... 201810589390.9
(Continued)

(51) Int. Cl.
*G06N 20/00* (2019.01)
*G06F 8/10* (2018.01)
(Continued)

(52) U.S. Cl.
CPC ................ *G06F 8/433* (2013.01); *G06F 8/10* (2013.01); *G06F 8/35* (2013.01); *G06F 8/447* (2013.01); *G06N 20/00* (2019.01)

(58) Field of Classification Search
CPC .... G06F 8/72; G06F 8/76; G06N 5/04; H04L 67/10; H04L 67/34
See application file for complete search history.

(56) References Cited

U.S. PATENT DOCUMENTS 6,381,738 B1* 4/2002 Choi ....................... G06F 8/443
717/124
7,558,935 B1 7/2009 Boucher et al.
(Continued)

FOREIGN PATENT DOCUMENTS

CN  101782976 A   7/2010
CN  102289496 A  12/2011
(Continued)

OTHER PUBLICATIONS

Hao Xu et al., "DR-BW: Identifying Bandwidth Contention in NUMA Architectures with Supervised Learning", [Online], pp. 367-376, [Retrieved from Internet on Jan. 29, 2022], <https://ieeexplore.ieee.org/stamp/stamp.jsp?tp=&arnumber=7967126>, (Year: 2017).*

(Continued)

*Primary Examiner* — Ziaul A Chowdhury
(74) *Attorney, Agent, or Firm* — Getech Law LLC; Jun Ye

(57) ABSTRACT

Disclosed are a general machine learning model generation method and apparatus, and a computer device and a storage medium. The method comprises: acquiring task parameters of a machine learning task (S1201); performing classification processing on the task parameters to obtain task instructions and model parameters (S1202); aggregating the task instructions and the model parameters according to a data (Continued)

type to obtain stack data and heap data (S1203); and integrating the stack data and the heap data to obtain a general machine learning model (S1204). By means of the method, compiled results of a corresponding general model in the running of an algorithm can be directly executed, which avoids repetitive compilation, thus greatly improving the efficiency of machine learning algorithm implementation and shortening the time from compilation to obtaining execution results.

15 Claims, 31 Drawing Sheets

(30) Foreign Application Priority Data

| | | |
|---|---|---|
| Nov. 30, 2018 | (CN) | 201811456246.4 |
| Nov. 30, 2018 | (CN) | 201811457719.2 |
| Nov. 30, 2018 | (CN) | 201811459679.5 |
| Nov. 30, 2018 | (CN) | 201811459853.6 |

(51) Int. Cl.
*G06F 8/35* (2018.01)
*G06F 8/41* (2018.01)

(56) References Cited

U.S. PATENT DOCUMENTS

| | | | |
|---|---|---|---|
| 9,086,950 | B2 | 7/2015 | Assarpour |
| 9,170,573 | B2* | 10/2015 | Kihas ............... G05B 17/02 |
| 9,460,002 | B1 | 10/2016 | Khokhar et al. |
| 10,089,080 | B2 | 10/2018 | Sellers-Blais |
| 2002/0049719 | A1 | 4/2002 | Shiomi et al. |
| 2010/0153677 | A1 | 6/2010 | Kim et al. |
| 2011/0107038 | A1 | 5/2011 | Akiyama |
| 2014/0074760 | A1 | 3/2014 | Boldyrev |
| 2015/0242760 | A1 | 8/2015 | Miao et al. |
| 2016/0292589 | A1 | 10/2016 | Taylor, Jr. et al. |
| 2018/0088996 | A1 | 3/2018 | Rossi et al. |
| 2018/0173674 | A1* | 6/2018 | Tamir ............... G06F 9/455 |
| 2021/0089961 | A1* | 3/2021 | Zeise ............... G06N 20/00 |
| 2021/0319363 | A1* | 10/2021 | Gillberg ............. G06V 20/10 |

FOREIGN PATENT DOCUMENTS

| | | |
|---|---|---|
| CN | 102609714 A | 7/2012 |
| CN | 104850592 A | 8/2015 |
| CN | 105683944 A | 6/2016 |
| CN | 105824713 A | 8/2016 |
| CN | 106371765 A | 2/2017 |
| CN | 106383842 A | 2/2017 |
| CN | 106682280 A | 5/2017 |
| CN | 106779087 A | 5/2017 |
| CN | 107251060 A | 10/2017 |
| CN | 107436762 A | 12/2017 |
| CN | 107563512 A | 1/2018 |
| CN | 107710238 A | 2/2018 |
| CN | 107749757 A | 3/2018 |
| CN | 107844371 A | 3/2018 |
| CN | 108229686 A | 6/2018 |
| CN | 108763268 A | 11/2018 |
| EP | 2953066 A2 | 12/2016 |
| EP | 3376361 A2 | 9/2018 |
| WO | 2018078590 A2 | 5/2018 |

OTHER PUBLICATIONS

Jingqiang Liu et al., "A Novel Approach for Detecting Browser-based Silent Miner", [Online], pp. 490-497, [Retrieved from Internet on Jan. 29, 2022], <https://ieeexplore.ieee.org/stamp/stamp.jsp?arnumber=8411900>, (Year: 2018).*

Karthik Gurunathan et al., "Case for Dynamic Parallelisation using Learning Techniques", [Online], pp. 32-39, [Retrieved from Interent on Jan. 29, 2022], <https://ieeexplore.ieee.org/stamp/stamp.jsp?tp=&arnumber=9115757> (Year: 2020).*

L Cheng et al., "Exploitation Techniques for Data-oriented Attacks with Existing and Potential Defense Approaches", [Online], pp. 1-36, [Retrieved from Internet on Feb. 26, 2022], <https://dl.acm.org/doi/pdf/10.1145/3462699>, (Year: 2021).*

Chao Yu et al., "LWPTool: A Lightweight Profiler to Guide Data Layout Optimization", [Online], pp. 2489-2502, [Retrieved from Internet on Feb. 26, 2022], <https://ieeexplore.ieee.org/stamp/stamp.jsp?arnumber=8367889> (Year: 2018).*

Probir Roy et al.m "StructSlim: A Lightweight Profiler to Guide Structure Splitting", [Online], pp. 36-46, [Retrieved from Internet on Feb. 26, 2022], <https://ieeexplore.ieee.org/stamp/stamp.jsp?arnumber=7559530>, (Year: 2016).*

PCT/CN2019/085853, International Search Report dated Aug. 6, 2019; 11 pages. No English Translation.

CN 201810588623.3—First Office Action, dated Aug. 12, 2020, 16 pages. (with English translation).

CN 201811456246.4—First Office Action, dated Mar. 17, 2021, 18 pages. (with English translation).

CN 201811456246.4—Second Office Action, dated Aug. 10, 2021, 9 pages. (with English translation).

CN 201811457719.2—First Office Action, dated Apr. 27, 2021, 17 pages. (with English translation).

CN 201811457719.2—Second Office Action, dated Oct. 19, 2021, 8 pages. (with English translation).

CN 201811457719.2—Third Office Action, dated Dec. 23, 2021, 7 pages. (with English translation).

CN 201811459679.5—First Office Action, dated Mar. 29, 2021, 14 pages. (with English translation).

CN 201811459679.5—Second Office Action, dated Sep. 27, 2021, 8 pages. (with English translation).

CN 201811459853.6—First Office Action, dated Mar. 31, 2021, 18 pages. (with English translation).

CN 201811459853.6—Second Office Action, dated Oct. 9, 2021, 8 pages. (with English translation).

CN 201811459853.6—Third Office Action, dated Dec. 15, 2021, 16 pages. (with English translation).

Marsj Hao, "TensorFlow Model Saving and Extraction Methods", Jun. 1, 2017, 1 page.

EP 19 815 956.8—Extended European Search Report, dated Oct. 4, 2021, 9 pages.

CN CN201811456246.4—Third Office Action, dated Nov. 12, 2021, 4 pages. (with brief English explanation).

Ke Bai, et al., Abstract: "Automatic and Efficient Heap Data Management for Limited Local Memory Multicore Architectures", [Online], pp. 593-598, [Retrieved from Internet on Apr. 24, 2021], <https://dl.acm.org/doi/pdf/10.5555/2485288.2485433>, Year: 2013, 4 pages.

Stylianos Mamagkakis, et al., Abstract: "Energy-Efficient Dynamic Memory Allocators at the Middleware Level of Embedded Systems", [Online], pp. 215-222, [Retrieved from Internet on Apr. 24, 2021], <https://dl.acm.org/doi/pdf/10.1145/1176887.1176919>, Year: 2006, 5 pages.

Sanjeev Kumar, et al., Abstract: "Dynamic Memory Management for Programmable Devices", [Online], pp. 139-149, [Retrieved from Interent on Apr. 24, 2021], <https://dl.acm.org/doi/pdf/10.1145/512429.512447>, Year: 2002, 4 pages.

Guan Wang, et al., Abstract: "Shared Last-Level Cache Management and Memory Scheduling for GPGPUs with Hybrid Main Memory", [Online], pp. 1-25, [Retrieved from Internet on Apr. 24, 2021], <https://dl.acm.org/doi/pdf/10.1145/3230643>, Year: 2018, 5 pages.

* cited by examiner

GENERAL MACHINE LEARNING MODEL, AND MODEL FILE GENERATION AND PARSING METHOD

RELATED APPLICATIONS

This application claims the benefit of International Patent Application No. PCT/CN2019/085853, filed May 7, 2019, and priority from Chinese Application No. 201811459853.6, with the title of "General Machine Learning Model File Parsing Method, Device, and Storage Medium" Chinese Application No. 201811459679.5, with the title of "General Machine Learning Model File Generation Method, Device, and Storage Medium", Chinese Application No. 201811457719.2, with the title of "Machine Learning Secondary Model File Generation Method, Device, and Storage Medium", Chinese Application No. 201811456246.4, with the title of "General Machine Learning Secondary Model File Parsing Method, Device, and Storage Medium", all of which were filed on Nov. 30, 2018; this application also claims the benefit of priority from Chinese Application No. 201810589390.9 with the title of "General Machine Learning Model Generation Method, Device, and Storage Medium", and Chinese Application No. 201810588623.3 with the title of "General Machine Learning Model Execution Method, Device, and Storage Medium", all of which were filed on Jun. 8, 2018. The disclosures of the above applications are incorporated herein by reference in their entirety.

TECHNICAL FIELD

The present disclosure relates to the field of artificial intelligence, and particularly relates to a general machine learning model and a model file generation method, a device, and a storage medium.

BACKGROUND

With the development of artificial intelligence technologies, various machine learning algorithms have appeared. When a traditional machine learning algorithm is running in a development platform, a compiling process is needed before each execution. As a result, in the process of machine learning, repeated compilations for an algorithm can take a long time, which may lead to low executing efficiency of the algorithm.

SUMMARY

In view of this, the present disclosure discloses a machine learning model generation method, an execution method, a method of use, a device, and a storage medium, so as to directly read a corresponding general-purpose model in a general machine learning model file according to operation needs in a process of machine learning operation. Therefore, repeated compilations can be avoided, which may greatly improve the efficiency of the implementation of a machine learning algorithm and shorten the time spent in a process from compiling to obtaining execution results.

The present disclosure provides a method for generating a general machine learning model. The method includes:
obtaining task parameters of a machine learning task;
classifying the task parameters to obtain task instructions and model parameters;
aggregating the task instructions and the model parameters according to data types to obtain stack data and heap data; and
integrating the stack data and the heap data to obtain a general machine learning model.

In an example, the task parameters include algorithm control parameters and computation parameters;
the classifying the task parameters to obtain the task instructions and the model parameters include:
compiling the algorithm control parameters to obtain the task instructions; and
classifying the computation parameters to obtain the model parameters.

In an example, the step of classifying the computation parameters to obtain the model parameters includes:
preprocessing the computation parameters to obtain preprocessed model data;
obtaining hardware parameters according to the computation parameters; and
extracting data attribute parameters in the computation parameters.

In an example, the step of aggregating the task instructions and the model parameters according to the data types to obtain the stack data and the heap data includes:
classifying the task instructions to obtain task instruction heap data;
classifying the model parameters according to the data types to obtain model parameter stack data and model parameter heap data;
aggregating the model parameter stack data to obtain the stack data; and
aggregating the model parameter heap data to obtain the heap data.

In an example, the step of classifying the model parameters according to the data types to obtain the model parameter stack data and the model parameter heap data includes:
classifying the model parameters according to a shared attribute to obtain shareable model parameters and unshareable model parameters;
aggregating the shareable model parameters to obtain the model parameter heap data; and
aggregating the unshareable model parameters to obtain the model parameter stack data.

In an example, the model parameter heap data includes model parameter static data and model parameter dynamic data;
the integrating the stack data and the heap data to obtain a general machine learning model includes:
packaging and integrating the task instruction heap data and the model parameter static data to obtain successive static data blocks;
packaging and integrating the model parameter dynamic data to obtain successive dynamic data blocks;
packaging and integrating the model parameter stack data to obtain stack data blocks; and
combining the successive static data blocks, the successive dynamic data blocks, and the stack data blocks to obtain a general machine learning model.

In an example, the step of combining the successive static data blocks, the successive dynamic data blocks, and the stack data blocks to obtain a general machine learning model includes:
obtaining layout information of the static data, layout information of the dynamic data, and layout information of the stack data according to the task instructions;

packaging and integrating the task instruction heap data and the model parameter static data according to the layout information of the static data to obtain the successive static data blocks;

packaging and integrating the model parameter dynamic data according to the layout information of the dynamic data to obtain the successive dynamic data blocks;

packaging and integrating the model parameter stack data according to the layout information of the stack data to obtain the stack data blocks; and integrating the successive static data blocks, the successive dynamic data blocks, and the stack data blocks.

In an example, the step of extracting the data attribute parameters in the computation parameters includes:

obtaining attributes of input data, attributes of output data, and attributes of intermediate result temporary space of the computation parameters;

extracting a data amount of the input data from the attributes of the input data, and allocating storage space to the input data;

extracting a data amount of the output data from the attributes of the output data, and allocating storage space to the output data;

extracting a data amount of the intermediate result temporary space from the attributes of the intermediate result temporary space, and allocating storage space to the intermediate result temporary space; and storing the input data storage space and the output data storage space as heap data, and storing the intermediate result temporary space as stack data.

In an example, the step of packaging and integrating the model parameter stack data according to the layout information of the stack data to obtain the stack data blocks includes:

integrating the unshareable model parameters and intermediate result temporary space data according to the layout information of the stack data to obtain the stack data blocks.

In an example, the step of obtaining hardware parameters according to the computation parameters includes:

obtaining hardware platform information and hardware configuration parameters, and storing the hardware platform information and the hardware configuration parameters as heap data.

In an example, the step of packaging and integrating the task instruction heap data and the model parameter static data according to the layout information of the static data to obtain the successive static data blocks includes:

integrating the task instruction heap data, the shareable model parameters, the hardware platform information, and the hardware configuration parameters according to the layout information of the static data to obtain the successive static data blocks.

In an example, the step of packaging and integrating the model parameter dynamic data according to the layout information of the dynamic data to obtain the successive dynamic data blocks includes:

integrating the input data storage space and the output data storage space according to the layout information of the dynamic data to obtain the successive dynamic data blocks.

The present disclosure provides a device for generating a general machine learning model. The device includes:

an external interface module configured to obtain task parameters of a machine learning task;

a classification processing module configured to classify the task parameters to obtain task instructions and model parameters;

a parameter aggregating module configured to aggregate the task instructions and the model parameters according to data types to obtain stack data and heap data; and a model generation module configured to integrate the stack data and the heap data to obtain a general machine learning model.

In an example, the task parameters include algorithm control parameters and computation parameters;

the classification processing module includes:

a task instruction generation module configured to compile the algorithm control parameters to obtain the task instructions; and a model parameter generation module configured to classify the computation parameters to obtain the model parameters.

In an example, the model parameter generation module includes:

a model parameter stack data generation module configured to aggregate shareable model parameters to obtain model parameter stack data; and a model parameter heap data generation module configured to aggregate unshareable model parameters to obtain model parameter heap data.

In an example, the model parameter heap data generation module includes:

a model parameter static data generation module configured to aggregate static model parameter heap data to obtain model parameter static data; and a model parameter dynamic data generation module configured to aggregate dynamic model parameter heap data to obtain model parameter dynamic data.

In an example, the model parameter generation module further includes:

a preprocessing module configured to preprocess the computation parameters to obtain preprocessed model data;

a hardware parameter generation module configured to obtain hardware parameters according to the computation parameters; and an attribute extraction module configured to extract data attribute parameters in the computation parameters.

In an example, the task instructions include task instruction heap data; and a parameter aggregator includes:

a stack data aggregator configured to package and integrate the model parameter stack data to obtain stack data blocks;

a model parameter dynamic data aggregator configured to package and integrate the model parameter dynamic data to obtain successive dynamic data blocks; and a model parameter static data aggregator configured to package and integrate the task instruction heap data and the model parameter static data to obtain successive static data blocks.

In an example, the model generation module is configured to combine the successive static data blocks, the successive dynamic data blocks, and the stack data blocks to obtain a general machine learning model.

The present disclosure provides a computer device, which includes a memory and a processor. A computer program is stored in the memory, and the processor is configured to implement the steps of the method provided in any of the above examples when executing the computer program.

The present disclosure provides a computer-readable storage medium on which a computer program is stored. When executed by a processor, the computer program implements the steps of the method provided in any of the above examples.

The present disclosure provides a method for executing a general machine learning model. The method includes:

obtaining a general machine learning model;

classifying and disassembling the general machine learning model to obtain stack area data and heap area data; and obtaining output data according to the stack area data, the heap area data, and input data.

Examples of the present disclosure also provide a device for executing a general machine learning model. The device includes:

a model obtaining module configured to obtain a general machine learning model;

a model disassembling module configured to classify and disassemble the general machine learning model to obtain stack area data and heap area data; and a result outputting module configured to obtain the stack area data, the heap area data, and the input data for performing computation to obtain output data.

In an example, the stack area data includes stack data, and the heap area data includes heap data; the step of classifying and disassembling the general machine learning model to obtain stack data and heap data includes:

disassembling shareable data in the general machine learning model into stack data;

allocating the stack data to a stack area;

disassembling unshareable data in the general machine learning model into heap data; and allocating the heap data to a heap area.

In an example, the stack data includes model parameter stack data, and the stack area data includes data in a plurality of stack areas;

the step of allocating the stack data to the stack area to obtain the stack area data includes:

allocating the model parameter stack data to a model parameter stack area.

In an example, the step of allocating the model parameter stack data to the model parameter stack area includes:

calculating a sum of sizes of storage space required for the model parameter stack data and sizes of intermediate result temporary storage space to obtain a size of a first storage space; and allocating a storage space to the model parameter stack area, where the storage space of the model parameter stack area is greater than or equal to the size of the first storage space.

In an example, the method further includes:

storing heap data changed in a running phase as model parameter dynamic data; and storing heap data unchanged in the running phase as model parameter static data.

In an example, the step of allocating the heap data to the heap area includes:

dividing the heap area into a model parameter dynamic heap area and a model parameter static heap area;

allocating the model parameter dynamic data to the model parameter dynamic heap area; and allocating the model parameter static data to the model parameter static heap area.

In an example, the step of allocating the model parameter dynamic data to the model parameter dynamic heap area includes:

adding a storage space of the model parameter dynamic data, a storage space of input data, and a storage space of output data to obtain a size of a second storage space; and allocating a storage space to the model parameter dynamic heap area, where the storage space of the dynamic data heap area is greater than or equal to the size of the second storage space.

In an example, the storage space of the model parameter static heap area is greater than or equal to the storage space of the model parameter static data.

In an example, the model parameter static data includes task instruction heap data.

In an example, the step of allocating the heap data to the heap area to obtain heap area data further includes:

allocating the model parameter dynamic heap area and the model parameter static heap area to a successive section of a storage space.

In an example, data in the heap area includes the model parameter dynamic data, the model parameter static data, the input data, and the output data.

In an example, the step of performing computation according to the stack area data, the heap area data, and the input data to obtain the output data further includes:

extracting the output data from the heap area; and outputting the output data.

The present disclosure provides a device for executing a general machine learning model. The device includes:

a model obtaining module configured to obtain a general machine learning model;

a model disassembling module configured to classify and disassemble the general machine learning model to obtain stack area data and heap area data; and a result outputting module configured to obtain the stack area data, the heap area data, and input data for performing computation to obtain output data.

In an example, the stack area data includes stack data, and the heap area data includes heap data; the model disassembling module includes:

a stack area data allocating module configured to disassemble unshareable data in the general machine learning model into stack data; and a heap area data allocating module configured to disassemble shareable data in the general machine learning model into heap data.

In an example, the stack area data allocating module is further configured to allocate the stack data to a stack area.

In an example, the heap area data allocating module is further configured to allocate the heap data to a heap area.

In an example, the stack data includes model parameter stack data; the stack data allocating module is further configured to allocate the model parameter stack data to the model parameter stack area.

In an example, the heap data includes model parameter static data and model parameter dynamic data; the heap data allocating module further includes:

a model parameter static data allocating module configured to allocate the model parameter static data to a model parameter static heap area; and a model parameter dynamic data allocating module configured to allocate the model parameter dynamic data to a model parameter dynamic heap area.

In an example, the result outputting module further includes:

a data extraction module configured to extract the output data from the heap area; and a data outputting module configured to output the output data.

The present disclosure provides a computer device, which includes a memory and a processor. A computer program is stored in the memory, and the processor implements the steps of the method provided in any of the above examples when executing the computer program.

The present disclosure provides a computer-readable storage medium on which a computer program is stored. When executed by a processor, the computer program implements the steps of the method provided in any of the above examples.

The present disclosure provides a method for generating a general machine learning model file. The general machine learning model file includes a general machine learning model and a model directory. The generation method includes:

obtaining the general machine learning model;

calculating a storage offset of the general machine learning model;

generating the model directory according to the general machine learning model and the storage offset of the general machine learning model; and generating the general machine learning model file according to the general machine learning model and the model directory.

In an example, the step of generating the general machine learning model file according to the general machine learning model and the model directory includes:

obtaining a file header and a file tail of the general machine learning model file; and generating the general machine learning model file according to the file header, the model directory, the general machine learning model, and the file tail.

In an example, the step of calculating the storage offset of the general machine learning model includes:

obtaining a size of storage space occupied by each general machine learning model and a number of the general machine learning models;

obtaining a storage order of the general machine learning models; and calculating a storage offset of each general machine learning model according to the size of the storage space occupied by each general machine learning model, the number of the general machine learning models, and the storage order of the general machine learning models.

In an example, the step of generating the general machine learning model file according to the general machine learning model and the model directory includes:

creating an identification code of the general machine learning model file; and generating the general machine learning model file according to the identification code, the general machine learning model, and the model directory.

In an example, the step of generating the general machine learning model file according to the general machine learning model and the model directory further includes:

creating a check code and/or an error correction code of the general machine learning model file; and generating the general machine learning model file according to the check code and/or the error correction code of the general machine learning model file, the general machine learning model, and the model directory.

In an example, the generating the general machine learning model file according to the general machine learning model and the model directory further includes:

creating an error correction code of the general machine learning model file; and generating a general machine learning model file according to the error correction code of the general machine learning model file, the general machine learning model, and the model directory.

In an example, the step of generating the general machine learning model file according to the general machine learning model and the model directory further includes:

calculating the size of the storage space required for the general machine learning model file; and generating the general machine learning model file according to the general machine learning model, the size of the storage space required for the general machine learning model file, and the model directory.

The present disclosure provides a method for generating a general machine learning model file. The method includes:

obtaining task parameters of a machine learning task;

classifying the task parameters to generate task instructions and model parameters;

aggregating the task instructions and the model parameters according to data types to generate stack data and heap data;

integrating the stack data and the heap data to generate a general machine learning model;

calculating a storage offset of the general machine learning model;

generating a model directory according to the general machine learning model and the storage offset of the general machine learning model; and generating a general machine learning model file according to the general machine learning model and the model directory.

The present disclosure provides a device for generating a general machine learning model file. The general machine learning model file includes a general machine learning model and a model directory. The generation device includes: a model filler, a directory generator, and a file generator, where the model filler is connected to the directory generator, and the file generator is connected to the model filler and the directory generator respectively;

the model filler is configured to obtain the general machine learning model;

the directory generator is configured to calculate a storage offset of the general machine learning model, and generate a model directory according to the general machine learning model and the storage offset of the general machine learning model; and the file generator is configured to generate the general machine learning model file according to the general machine learning model and the model directory.

In an example, the model filler is further configured to sequentially store the general machine learning model into the file generator.

In an example, the file generator further includes a file header generator and a file tailer generator, where the file header generator is connected to the directory generator, and the file tailer generator is connected to the model filler.

In an example, the file header generator is further configured to create an identification code of a general machine learning model file, and generate the general machine learning model file according to the identification code of the general machine learning model file, the general machine learning model, and the model directory.

In an example, the file tailer generator is further configured to create a check code and/or an error correction code of the general machine learning model file.

In an example, the generation device further includes a file size calculator, where the file size calculator is connected to the directory generator. The file size calculator is configured to calculate a size of the storage space required for the general machine learning model, and calculate a size of the storage space required for the general machine learning model file.

The present disclosure provides a device for generating a general machine learning model file. The device includes:

an external interface module configured to obtain task parameters of a machine learning task;

a classification processing module configured to classify the task parameters to obtain task instructions and model parameters;

a parameter aggregating module configured to aggregate the task instructions and the model parameters according to data types to obtain stack data and heap data;

a model generation module configured to integrate the stack data and the heap data to obtain a general machine learning model;

a storage offset calculating module configured to calculate a storage offset of the general machine learning model;

a model directory generation module configured to generate the model directory according to the general machine learning model and the storage offset of the general machine learning model; and a model file generation module configured to generate the general machine learning model file according to the general machine learning model and the model directory.

In an example, the file size calculator is connected to a model storage optimizer. The present disclosure provides a computer device, which includes a memory and a processor. A computer program is stored in the memory. The processor implements the steps of the method provided in any of the above examples when executing the computer program.

The present disclosure provides a computer-readable storage medium on which a computer program is stored. When executed by a processor, the computer program implements the steps of the method provided in any of the above examples.

The present disclosure provides a method for generating a machine learning secondary model file. The machine learning secondary model file includes a secondary model and a secondary model directory. The generation method includes:

obtaining a general machine learning model;

performing storage optimization on the general machine learning model to generate the secondary model;

calculating a storage offset of the secondary model;

generating a secondary model directory according to the secondary model and the storage offset of the secondary model; and generating a machine learning secondary model file according to the secondary model and the secondary model directory.

In an example, the step of performing storage optimization on the general machine learning model to generate the secondary model includes: compressing and/or encrypting the general machine learning model to generate the secondary model.

In an example, the step of generating a machine learning secondary model file according to the secondary model and the secondary model directory includes:

obtaining a file header and a file tailer of the machine learning secondary model file; and generating the machine learning secondary model file according to the file header, the secondary model directory, the general machine learning model, and the file tail.

In an example, the step of calculating a storage offset of the secondary model includes:

obtaining a size of a storage space required for each general machine learning model and a count of the secondary models;

obtaining a storage order of the secondary models; and calculating a storage offset of each secondary model according to the size of the storage space required for each secondary model, the count of the secondary models, and the storage order of the secondary models.

In an example, the step of generating a machine learning secondary model file according to the general machine learning model and the model directory includes:

creating an identification code of the machine learning secondary model file; and generating a machine learning secondary model file according to the identification code of the model file, the secondary model, and the secondary model directory.

In an example, the step of generating a machine learning secondary model file according to the secondary model and the model directory includes:

creating a check code and/or error correction code of the machine learning secondary model file; generating the machine learning secondary model file according to the check code and/or error correction code of the machine learning secondary model file, the secondary model, and the secondary model directory.

The present disclosure provides a method for generating a general machine learning model file. The method includes:

obtaining task parameters of a machine learning task;

classifying the task parameters to generate task instructions and model parameters;

aggregating the task instructions and the model parameters according to data types to generate stack data and heap data;

integrating the stack data and the heap data to generate a general machine learning model;

performing storage optimization on the general machine learning model to generate the secondary model; calculating a storage offset of the secondary model;

generating a secondary model directory according to the secondary model and the storage offset of the secondary model; and generating a machine learning secondary model file according to the secondary model and the model directory.

The present disclosure provides a device for generating a machine learning secondary model file. The machine learning secondary model file includes a secondary model and a secondary model directory. The device includes:

a secondary model filler, a model storage optimizer, a directory generator, and a file generator, where the model filler is connected to the directory generator, and the file generator is connected to the model filler and the directory generator respectively, and the model storage optimizer is connected to the model filler;

the secondary model filler is configured to obtain a general machine learning model;

the model storage optimizer is configured to perform storage optimization on the general machine learning model to generate a secondary model;

the directory generator is configured to calculate a storage offset of the general machine learning model, and generate a secondary model directory according to the secondary model and the storage offset of the secondary model; and the file generator is configured to generate a machine learning secondary model file according to the secondary model and the secondary model directory.

In an example, the secondary model filler is further configured to sequentially store the secondary model into the file generator.

In an example, the file generator further includes a file header generator and a file tailer generator, where the file header generator is connected to the directory generator, and the file tailer generator is connected to the secondary model filler.

In an example, the file header generator is further configured to create an identification code of a secondary model, and generate a machine learning secondary model file according to the identification code, the secondary model, and the secondary model directory.

In an example, the file tailer generator is further configured to create a check code and/or an error correction code of the machine learning secondary model file.

In an example, the device further includes a file size calculator, where the file size calculator is connected to the directory generator. The file size calculator is configured to calculate a size of the storage space required for the general machine learning model, and calculate a size of the storage space required for the model file.

In an example, the file size calculator is connected to a model storage optimizer.

The present disclosure provides a computer device, which includes a memory and a processor. A computer program is stored in the memory. The processor implements the steps of the method provided in any of the above examples when executing the computer program.

The present disclosure provides a computer-readable storage medium on which a computer program is stored. When executed by a processor, the computer program implements the steps of the method provided in any of the above examples.

The present disclosure provides a method for parsing a general machine learning model file. The general machine learning model file includes a general machine learning model and a secondary model directory. The method includes:
  obtaining a general machine learning model file;
  reading a secondary model directory in the general machine learning model file;
  reading a target secondary model according to the secondary model directory; and
  restoring the target secondary model to obtain a target general machine learning model.

In an example, the obtaining a general machine learning model file includes:
  obtaining an identification code of the general machine learning model file; and
  detecting whether the identification code complies with a preset rule; and
  if the identification code complies with the preset rule, reading a secondary model directory in the general machine learning model file.

In an example, if the identification code complies with the preset rule, the reading a model directory in the general machine learning model file includes:
  obtaining a check code of the general machine learning model file;
  checking whether the check code is consistent with a preset standard code, and if the check code is inconsistent with the preset standard code, performing an error correction operation.

In an example, the checking whether the check code is consistent with the preset standard code, and if the check code is inconsistent with the preset standard code, performing the error correction operation includes:
  obtaining an error correction code;
  performing an error correction operation on the general machine learning model file according to the error correction code to obtain an error-corrected model file;
  checking whether a check code of the error-corrected general machine learning model file is consistent with the preset standard code; and
  if the check code of the error-corrected general machine learning model file is consistent with the preset standard code, reading the secondary model directory in the general machine learning model file.

In an example, the reading the target secondary model according to the secondary model directory includes:
  obtaining a storage offset of the target secondary model in the general machine learning model file; and
  reading the target general machine learning model according to the storage offset.

In an example, the method further includes:
  reading hardware parameter information in the general machine learning model; and
  generating hardware matching information according to the hardware parameter information.

In an example, the method further includes:
  classifying and disassembling the general machine learning model to obtain stack area data and heap area data; and
  performing computation according to input data, the stack area data, and the heap area data to obtain output data.

The present disclosure provides a device for parsing a general machine learning model file. The general machine learning model file includes a general machine learning model and a secondary model directory. The device includes: a file obtainer, a model distributor, a directory parser, and a model reader, where the directory parser is connected to the file obtainer, the model distributor, and the model reader, respectively;

the file obtainer is configured to obtain a general machine learning model file;
  the model distributor is configured to read a secondary model directory in the general machine learning model file, read a target secondary model according to the secondary model directory, and restore the target secondary model to obtain a target general machine learning model;
  the directory parser is configured to read a model directory in the general machine learning model file; and
  the model reader is configured to read a target general machine learning model according to the model directory.

The present disclosure provides a computer device, which includes a memory and a processor. A computer program is stored in the memory. The processor implements the steps of the method provided in any of the above examples when executing the computer program.

The present disclosure provides a computer-readable storage medium on which a computer program is stored. When executed by a processor, the computer program implements the steps of the method provided in any of the above examples.

The present disclosure provides a method for parsing a general machine learning model file. The method includes:
  obtaining a general machine learning model file;
  reading a model directory in the general machine learning model file; and
  reading a target general machine learning model according to the model directory.

In an example, the step of obtaining a general machine learning model file includes:

obtaining a file identification code of the general machine learning model file;

detecting whether the file identification code complies with a preset rule; and if the file identification code complies with the preset rule, reading a model directory in the general machine learning model file.

In an example, if the file identification code complies with a preset rule, the reading a model directory in the general machine learning model file includes:

obtaining a check code of the general machine learning model file;

checking whether the check code is consistent with the preset standard code, and if the check code is inconsistent with the preset standard code, performing an error correction operation.

In an example, the checking whether the check code is consistent with a preset standard code, and if the check code is inconsistent with the preset standard code, performing an error correction operation includes:

obtaining an error correction code;

performing an error correction operation on the general machine learning model file according to the error correction code to obtain an error-corrected model file;

checking whether the check code of the error-corrected model file is consistent with the preset standard code;

if the check code of the error-corrected general machine learning model file is consistent with the preset standard code, reading the model directory in the general machine learning model file.

In an example, the reading a corresponding general machine learning model according to the model directory includes:

obtaining a storage offset of the target general machine learning model in the general machine learning model file; and reading the target general machine learning model according to the storage offset.

The present disclosure provides a method for parsing a general machine learning model file, the method includes:

obtaining a general machine learning model file;

reading a secondary model directory in the general machine learning model file;

reading a target secondary model according to the secondary model directory; and restoring the target secondary model to obtain a target general machine learning model.

In an example, the method further includes:

reading hardware parameter information in the general machine learning model; and generating hardware matching information according to the hardware parameter information.

In an example, the method further includes:

classifying and disassembling the general machine learning model to obtain stack area data and heap area data; and performing computation according to input data, the stack area data, and the heap area data to obtain output data.

The present disclosure provides a device for parsing a general machine learning model file. The device includes:

a file obtainer, a directory parser, and a model reader, where the directory parser is connected to the file obtainer and the model reader, respectively;

the file obtainer is configured to obtain a general machine learning model file;

the directory parser is configured to read a model directory in the general machine learning model file; and the model reader is configured to read a target general machine learning model according to the model directory.

The present disclosure provides a computer device, which includes a memory and a processor. A computer program is stored in the memory. The processor implements the steps of the method provided in any of the above examples when executing the computer program.

The present disclosure provides a computer-readable storage medium on which a computer program is stored. When executed by a processor, the computer program implements the steps of the method provided in any of the above examples.

Details of one or more examples of the present disclosure are described in the accompanied drawings and descriptions below. Other features, objects, and advantages of the present disclosure will be apparent in the specification, the drawings, and the claims.

BRIEF DESCRIPTION OF THE DRAWINGS

In order to explain the technical solutions in the examples of the present disclosure or the prior art more clearly, accompanied drawings required for the examples of the present disclosure or the prior art will be briefly described hereinafter. Apparently, the described drawings are merely examples of the present disclosure. Other examples can be obtained by those of ordinary skill in the art based on the disclosed accompanied drawings without creative efforts.

DETAILED DESCRIPTION OF THE EXAMPLES

Technical solutions in the examples of the present disclosure will be described clearly and completely hereinafter with reference to the accompanied drawings in the examples of the present disclosure. Apparently, the described examples are merely some rather than all examples of the present disclosure. All other examples obtained by those of ordinary skill in the art based on the examples of the present disclosure without creative efforts shall fall within the protection scope of the present disclosure.

The present disclosure discloses a method for generating a machine learning model, a method for executing a machine learning model, a method for using a machine learning model, a device, and a storage medium, so as to directly read a corresponding general model in a general machine learning model file according to operation needs in a process of machine learning operation. Therefore, repeated compilations can be avoided, which may greatly improve the efficiency of the implementation of a machine learning algorithm and shorten time spent in a process from compiling to obtaining execution results.

Figure 1:
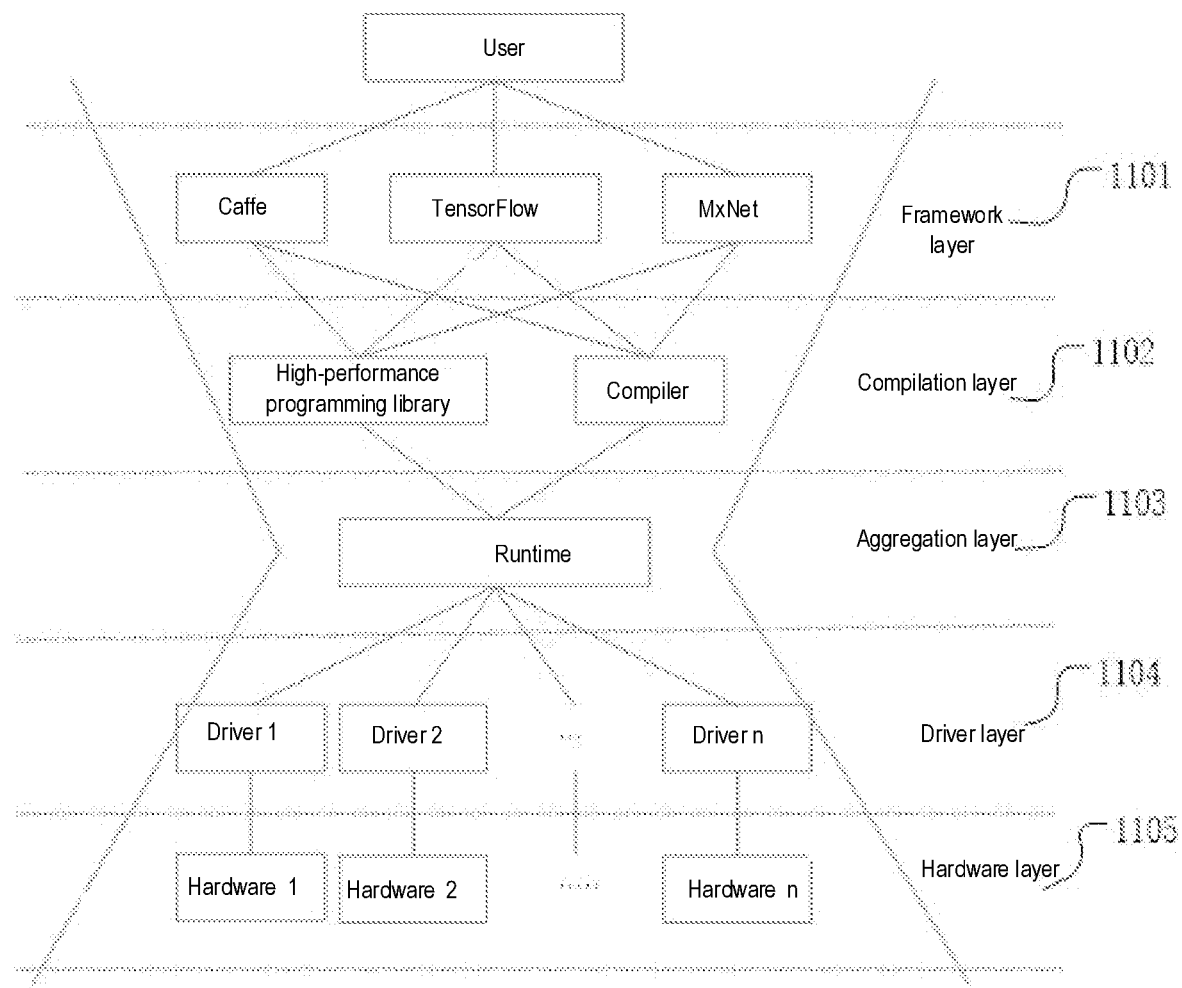
FIG. 1 is an application environment diagram of a method for generating a general machine learning model according to an example of the present disclosure.

The method for generating a general machine learning model provided in the present disclosure can be applied to an application environment as shown in FIG. 1. The application environment shown in FIG. 1 is a machine learning development platform, which includes a framework layer 1101, a compilation layer 1102, an aggregation layer 1103, a driver layer 1104, and a hardware layer 1105.

In an example, the framework layer 1101 is configured to provide algorithm design conditions of a machine learning task, and provide convenient training and prediction tools to facilitate users for building their own neural network structures. It can be understood that the framework layer 101 is configured to:

receive user-designed machine learning algorithms (such as neural network structures);

parse out parameters of each sub-task and send the parameters of each sub-task to the compilation layer to generate machine instructions and related necessary elements; and send the machine instructions and the related necessary elements to a runtime layer for computation and finally complete a machine learning task required by users.

In an example, the compilation layer 1102 is configured to generate machine instructions in a machine learning task. Specifically, the compilation layer includes a compiler, a high-performance programming library specially optimized for high-frequency operators, and other modules, devices, and databases capable of generating machine instructions. It can be understood that the compilation layer 1102 is configured to receive parameters of the machine learning task sent by the upper framework layer 1101, generate binary machine instructions of hardware by compiling, and send the binary machine instructions of hardware to the lower runtime layer for storing or computing.

In an example, the aggregation layer 1103 is configured to further encapsulate driver programs, and can ignore differences between different underlying hardware and drivers to provide a unified program interface to the upper compilation layer 1102 or users. Specifically, the aggregation layer 1103 can encapsulate upper layer software without considering details of the hardware and the drivers. Furthermore, the aggregation layer 1103 is configured to provide a program interface for basic operations of a machine learning task, store and load a machine learning model and necessary elements such as machine instructions required for execution of the machine learning model on hardware. In this case, upper layer software and users only need to focus on the machine learning task rather than consider differences in specific hardware. Optionally, the program interfaces for the basic operations of the machine learning task provided by the aggregation layer may include a program interface for memory space allocation, data copy, computation starting, and other basic operations of the machine learning task.

In an example, the driver layer 1104 is configured to package and encapsulate basic operations of a device of the hardware layer 1105, and provide a callable program interface for the upper aggregation layer 1103. Specifically, the basic operations of the driver layer 1104 include controlling input and output of data streams, sending control signals to hardware, receiving and processing abnormal signals generated by the hardware, managing and scheduling multiple tasks, and the like.

In an example, the hardware layer 1105 includes all hardware facilities in the machine learning development platform. Optionally, the hardware layer 1105 includes a primary processor, a coprocessor, a memory, an input/output device, a power supply module, and connecting equipment of the above facilities. It can be understood that the hardware layer 1105 is not limited to the above facilities.

Figure 2:
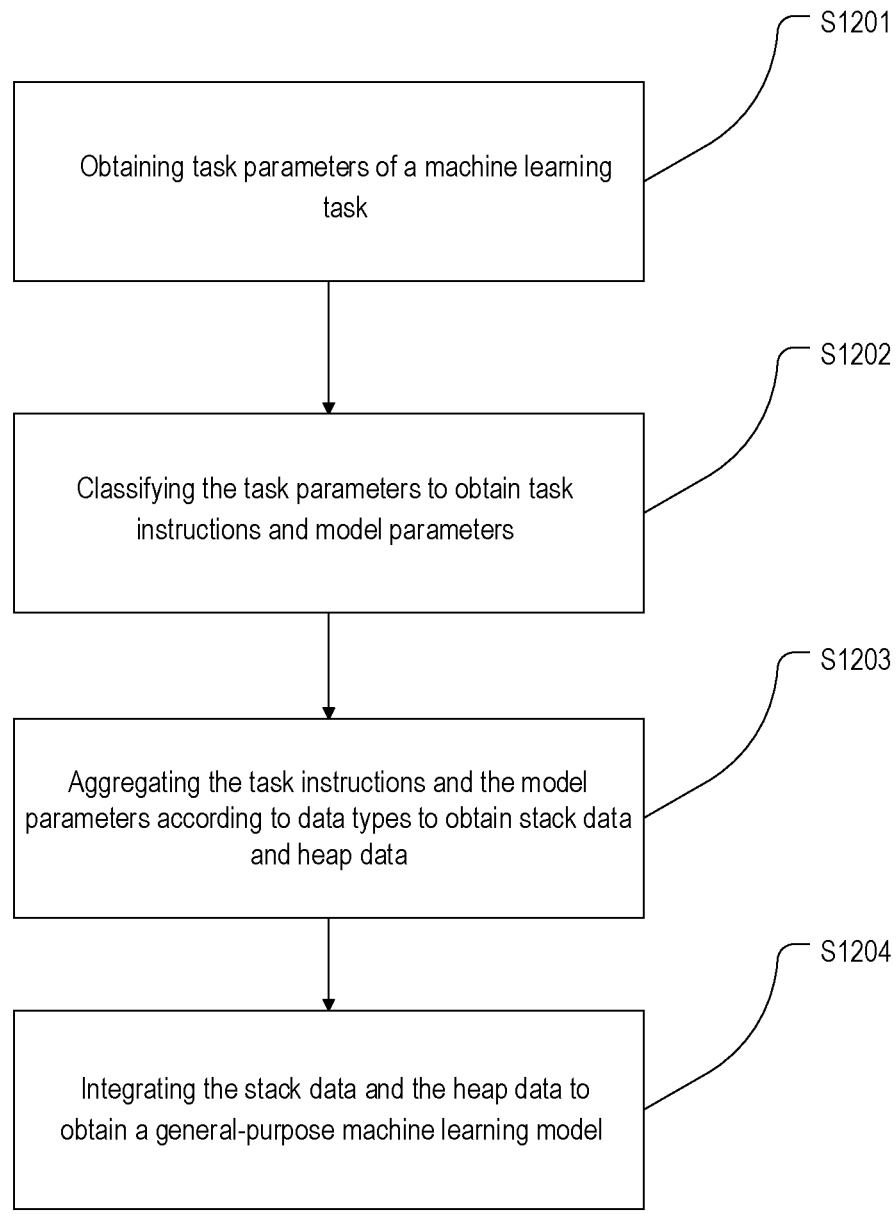
FIG. 2 is a flowchart of a method for generating a general machine learning model according to an example of the present disclosure.
Figure 3:
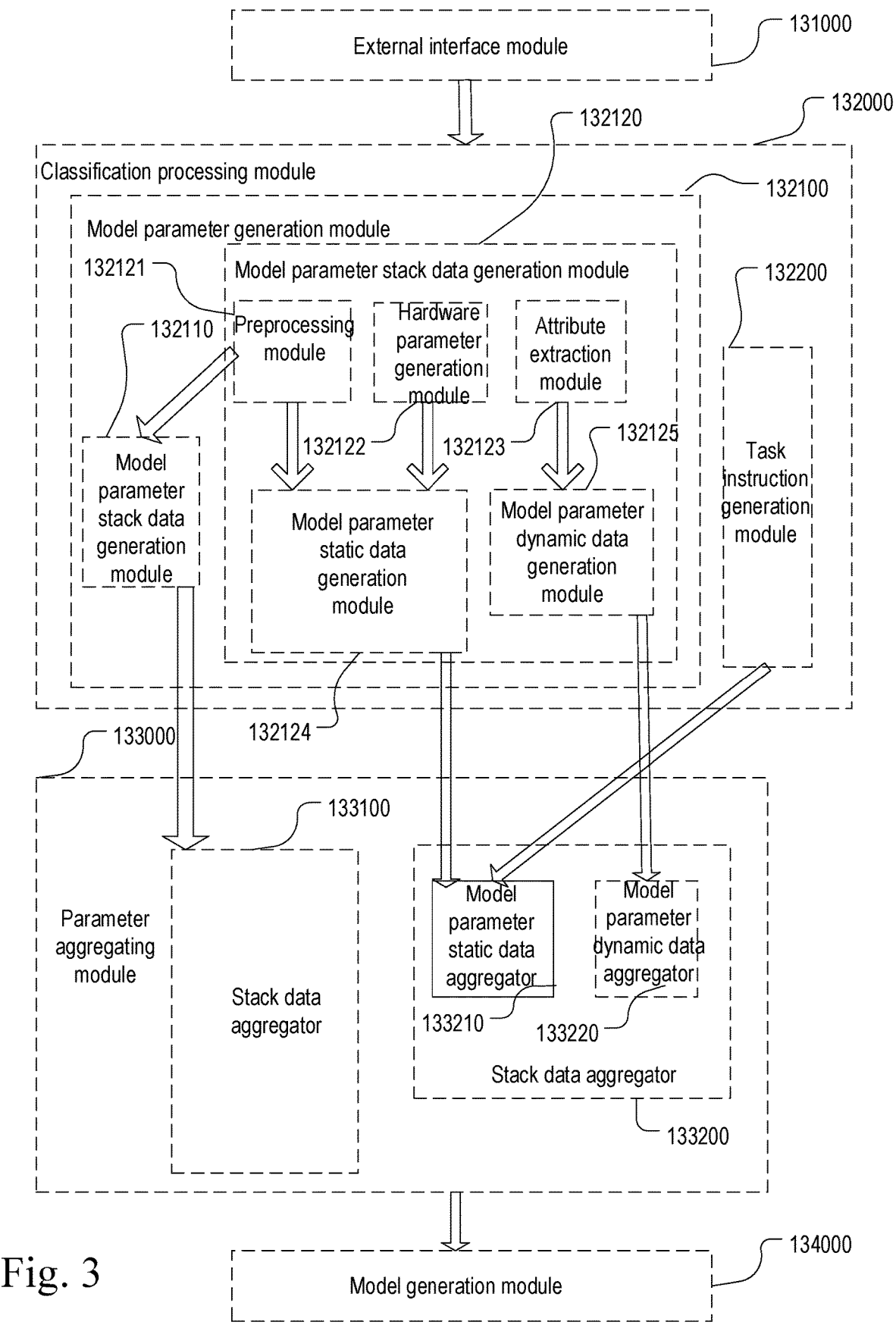
FIG. 3 is a schematic diagram of a device for generating a general machine learning model according to an example of the present disclosure.

In an example, referring to FIG. 2 and FIG. 3, a method and a device for generating a general machine learning model are provided. In an example, a step S1201 includes obtaining task parameters of a machine learning task. In an example, the task parameters of the machine learning task are obtained through an external interface module 131000. Specifically, the task parameters refer to parameters required to generate a general machine learning model, and include parameters other than input data and output data. Specifically, the task parameters are obtained from an external program's input, or from a user's input. It can be understood that when the task parameters are obtained from the user's input, the task parameters are obtained after the format of the user's input data is converted. In an example, a step S1202 includes classifying the task parameters to obtain task instructions and model parameters. In an example, the model parameters are obtained by a model parameter generation module 132100, and the task instructions are obtained by a task instruction generation module 132200. Specifically, the task instructions refer to compiled task parameters, and the model parameters refer to processing results of other processing of the task parameters required during operation of a machine learning algorithm.

In an example, a step S1203 includes aggregating the task instructions and the model parameters according to data types to obtain stack data and heap data. In an example, unshareable data is aggregated by a stack data aggregator 133100, and shareable data is aggregated by a heap data aggregator 133200. It can be understood that unshareable data refers to data that is not shared among cores in a multi-core platform; and shareable data refers to data shared among cores in a multi-core platform. Specifically, aggregating refers to packing and arranging task instructions and model parameters.

In an example, a step S1204 includes integrating the stack data and the heap data to obtain a general machine learning model. Specifically, the general machine learning model has good universality.

Specifically, the general machine learning model is compatible with different upper layer frameworks such as the upper framework layer 1101, the upper compilation layer 1102, and the upper aggregation layer 1103; and is also compatible with different lower driver layers and lower layer hardware. Further, after a general machine learning model is formed, data blocks can be adjusted according to different counts of computing cores, addresses of input data, addresses of output data, and other general machine learning models to adapt to different situations.

Specifically, steps of generating a general machine learning model are not limited to the above steps, and are not limited to the execution order of the above steps. Any modification based on the concept of the present disclosure shall be regarded as the protection scope of the present disclosure.

In an example, referring to FIG. 3, the task parameters include algorithm control parameters and computation parameters; and the step of classifying the task parameters to obtain task instructions and model parameters includes: compiling the algorithm control parameters to obtain task instructions. In an example, the algorithm control parameters are compiled by the task instruction generation module 132200.

Specifically, the algorithm control parameters include an operation structure of an algorithm. Specifically, compilation refers to a process of converting a high-level language into a machine language. It can be understood that compilation refers to a process of generating a target program. Specifically, the task instructions include instructions directly recognized and executed by a computer. It can be understood that the task instructions adopt a binary encoding format. In an example, the step of aggregating the task instructions and the model parameters according to data types to obtain stack data and heap data includes: classifying the task instructions to obtain task instruction stack data. In an example, the task instruction stack data refers to task instruction data generated by the task instruction generation module and shared among cores in a multi-core platform.

In an example, the computation parameters are classified by the model parameter generation module to obtain model parameters.

Specifically, the computation parameters include data other than input data and output data during a machine learning operation. Optionally, the classification processing includes processing of input data and output data required for machine learning, such as a preprocessing operation or a post-processing operation. Optionally, in machine learning, the classification processing also includes obtaining data or parameters, such as hardware platform information, required when performing a machine learning operation on input data. It can be understood that the classification processing is not limited to the preprocessing operation, the post-processing operation, or obtaining the hardware platform information. Other non-machine-learning operations performed on input data and output data also belong to the classification processing. Through the classification processing, different operations required for different computations of different input data on different hardware platforms become compatible. The classification processing can be modified and supplemented in practice to meet the application demand of the general machine learning model in different scenarios.

In an example, referring to FIG. 3, the computation parameters are classified by the model parameter generation module 132100 to obtain the model parameters. In an example, the step of aggregating the task instructions and the model parameters according to data types to obtain the stack data and the heap data includes: classifying the model parameters according to the data types to obtain model parameter stack data and model parameter heap data. In an optional example, the computation parameters are classified by the model parameter generation module 132100 to obtain model parameter stack data and model parameter heap data. Specifically, the model parameter stack data refers to model parameters that cannot be shared among cores in a multi-core platform, and the model parameter heap data refers to model parameters that can be shared among cores in a multi-core platform. Specifically, the model parameter stack data is obtained by the model parameter stack data generation module, and the model parameter heap data is obtained by the model parameter heap data generation module.

The step of classifying the computation parameters to obtain the model parameters includes preprocessing the computation parameters to obtain preprocessed model data. In an example, the computation parameters are preprocessed by a preprocessing module 132121. In an example, the preprocessing operation performed on the computation parameters includes performing a format conversion operation, a splitting operation, and a classification operation on the computation parameters. Optionally, the preprocessing operation is not limited to the format conversion operation, the splitting operation, and the classification operation, and all other operations performed on the computation parameters belong to the preprocessing operation.

In an example, the step of classifying the computation parameters to obtain the model parameters includes obtaining hardware parameters according to the computation parameters. In an optional example, a hardware parameter generation module 132122 is configured to generate hardware parameters. In an example, the hardware parameters include fixed index parameters of a hardware device, such as a model, the number of cuda cores, the size of a private cache, a size of a shared cache, and an access bandwidth of a GPU.

In an example, the step of classifying the computation parameters to obtain the model parameters includes extracting data attribute parameters from the computation parameters. In an optional example, an attribute parameter extraction module 132123 is configured to extract data attribute parameters in the computation parameters. In an example, the step of obtaining hardware parameters according to the computation parameters includes: obtaining hardware platform information and hardware configuration parameters, and storing the hardware platform information and the hardware configuration parameters as heap data. In an example, the attribute parameters include some unique characteristics of data. For instance, when the input data is an image, the attribute parameters include an image size, a count of channels, a storage space occupied by the image, a storage format, a data type of each pixel, etc.

In an example, the step of extracting data attribute parameters in the computation parameters by the attribute extraction module 132123 includes:
obtaining input data attributes, output data attributes, and intermediate result temporary space attributes of the computation parameters; extracting a data amount of the input data from the attributes of the input data, and allocating the input data storage space; extracting a data amount of the output data from the attributes of the output data, and allocating the output data storage space; extracting a data amount of the intermediate result temporary space from the attributes of the intermediate result temporary space, and allocating the intermediate result temporary storage space; and storing the input data storage space and the output data storage space as heap data, and storing the intermediate result temporary space as stack data.

In an example, the step of classifying the model parameters according to the data types to obtain the model parameter stack data includes: classifying the model parameters according to shared attributes to obtain shareable model parameters and unshareable model parameters; and aggregating the unshareable model parameters to obtain the model parameter stack data. In an example, the model parameter stack data is generated by a model parameter stack data generation module 132110. In an example, the step of aggregating the task instructions and model parameters according to the data types to obtain stack data and heap data includes: aggregating the model parameter stack data to obtain the stack data. In an example, the stack data is aggregated by a stack data aggregator 133100. By aggregating the stack data, the unshareable data can be processed uniformly to pattern the stack data in the machine learning model, so as to make the generated machine learning model universal.

In an example, the step of packaging and integrating the model parameter stack data according to layout information of the stack data to obtain the stack data blocks further includes: integrating the unshareable model parameters and the intermediate result temporary space data according to the layout information of the stack data to obtain the stack data blocks.

In an example, the step of classifying the model parameters according to data types to obtain model parameter heap data includes: classifying the model parameters according to shared attributes to obtain shareable model parameters and unshareable model parameters; and aggregating the shareable model parameters to obtain the model parameter heap data. In an example, the model parameter heap data is obtained by a model parameter heap data generation module 132120 performing the above steps. By aggregating the heap data, the shareable data can be processed uniformly to pattern the heap data in the machine learning model, so as to make the generated machine learning model universal.

In an example, the model parameter heap data includes model parameter static data and model parameter dynamic data. Specifically, the model parameter static data refers to data that does not change during running of a machine learning algorithm, such as task instructions, model parameter heap data, and hardware platform information. The model parameter dynamic data refers to data that changes during the running of a machine learning algorithm, such as input data and output data.

In an example, the step of integrating the stack data and the heap data to obtain a general machine learning model includes: packaging and integrating the task instruction heap data and the model parameter static data by using a static data aggregator 133210 to obtain successive static data blocks. In an example, the task instruction heap data, model parameter heap data, hardware platform information, and hardware configuration parameters are integrated according to the static data layout information to obtain the successive static data blocks.

By aggregating the static data blocks, data of the static data blocks can be processed uniformly to pattern the static data in the machine learning model, so as to make the generated machine learning model universal.

In an example, the step of integrating the stack data and the heap data to obtain a general machine learning model includes: packaging and integrating the model parameter dynamic data by using a dynamic data aggregator 133220 to obtain successive dynamic data blocks. In an example, the input data storage space and the output data storage space are integrated according to the layout information of the dynamic data to obtain the successive dynamic data blocks. By aggregating the dynamic data blocks, data of the dynamic data blocks can be processed uniformly to pattern the dynamic data in the machine learning model, so as to make the generated machine learning model universal.

In an example, the successive static data blocks, the successive dynamic data blocks, and the stack data blocks are combined to obtain a general machine learning model. In an optional example, the general machine learning model is stored in an offline file. Specifically, the offline file includes one or more general machine learning models. Specifically, a general machine learning model in an offline file is called according to a preset rule. Specifically, the offline file is stored in a hard disk according to an established rule. In an optional example, the offline file includes an online function. Specifically, the online function is stored in memory.

In an example, the step of combining the successive static data blocks, the successive dynamic data blocks, and the stack data blocks to obtain a general machine learning model includes: obtaining layout information of static data, layout information of dynamic data, and layout information of stack data according to the task instructions; packaging and integrating the task instruction heap data and the model parameter static data according to the layout information of the static data to obtain the successive static data blocks; packaging and integrating the model parameter dynamic data according to the layout information of the dynamic data to obtain the successive dynamic data blocks; packaging and integrating the model parameter stack data according to the layout information of the stack data to obtain the stack data blocks; and integrating the successive static data blocks, the successive dynamic data blocks, and the stack data blocks.

In an example, algorithm control parameters are compiled to obtain layout information of each data block. Specifically, layout information of data blocks is used for data block aggregation and integration, and each data block is stored according to the layout information of each data block to optimize memory allocation. In an optional example, the layout information of data blocks is used for prior storage of each data block in a whole block. In an optional example, when the storage space cannot satisfy the storage of a data block in a whole block, the memory allocation is optimized according to a processing order of a processor core, so as to facilitate the reading of data block information.

In an example, the method for generating a general machine learning model further includes generating a hardware-specific parameter set. Specifically, the hardware-specific parameter set refers to preparing related parameters in advance to make up for a shortage of hardware and satisfy operation needs of different machine learning algorithms.

In an example, referring to FIG. 3, a device for generating a general machine learning model is provided. The device includes: an external interface module 131000 configured to obtain task parameters of a machine learning task; a classification processing module 132000 configured to classify the task parameters to obtain task instructions and model parameters; a parameter aggregating module 133000 configured to aggregate the task instructions and the model parameters according to data types to obtain stack data and heap data; and a model generation module 134000 configured to integrate the stack data and the heap data to obtain a general machine learning model.

The above device for generating a general machine learning model is compatible with operation processes of various machine learning algorithms by classifying the task parameters, and can obtain a general model of a corresponding machine learning algorithm through aggregation and integration. The general model of the machine learning algorithm enables a compilation result of the corresponding general model to be directly executed during the operation of the algorithm. Therefore, repeated compilations can be avoided, which may greatly improve the efficiency of the implementation of a machine learning algorithm and shorten time spent in a process from compiling to obtaining execution results.

In an example, the task parameters include algorithm control parameters and computation parameters; the classification processing module 132000 includes: a task instruction generation module 132200 configured to compile the algorithm control parameters to obtain task instructions, and a model parameter generation module 132110 configured to classify the computation parameters to obtain model parameters.

In an example, the model parameter generation module 132100 includes: a model parameter stack data generation module 132110 configured to aggregate shareable model parameters to obtain model parameter stack data; and a model parameter heap data generation module 132120 configured to aggregate unshareable model parameters to obtain model parameter heap data.

In an example, the model parameter generation module further includes: a preprocessing module 132121 configured to preprocess the computation parameters to obtain preprocessed model data; and a hardware parameter generation module 132122 configured to obtain hardware parameters according to the computation parameters; and an attribute extraction module 132123 configured to extract data attribute parameters in the computation parameters.

In an example, the task instructions include task instruction heap data; the parameter aggregating module 133000 includes: a stack data aggregator 133100 configured to package and integrate the model parameter stack data to obtain stack data blocks; a model parameter dynamic data aggregator 133220 configured to package and integrate the model parameter dynamic data to obtain successive dynamic data blocks; and a model parameter static data aggregator 133210 configured to package and integrate the task instruction heap data and the model parameter static data to obtain successive static data blocks.

In an example, the model generation module 134000 is configured to combine the successive static data blocks, the successive dynamic data blocks, and the stack data blocks to obtain a general machine learning model.

Specific limitations on the device for generating a general machine learning model will not be described further herein. For details, please refer to the above-mentioned limitations on the method for generating a general machine learning model. Each module in the general machine learning model device may be implemented in whole or in part by software, hardware, and a combination of hardware and software. The each module can be embedded in the form of hardware in a processor, or be independent of a processor in a computer device, or be stored in the form of software in a memory of a computer device, so as to make it easier for the processor to call a module and perform an operation corresponding to the module.

Figure 4:
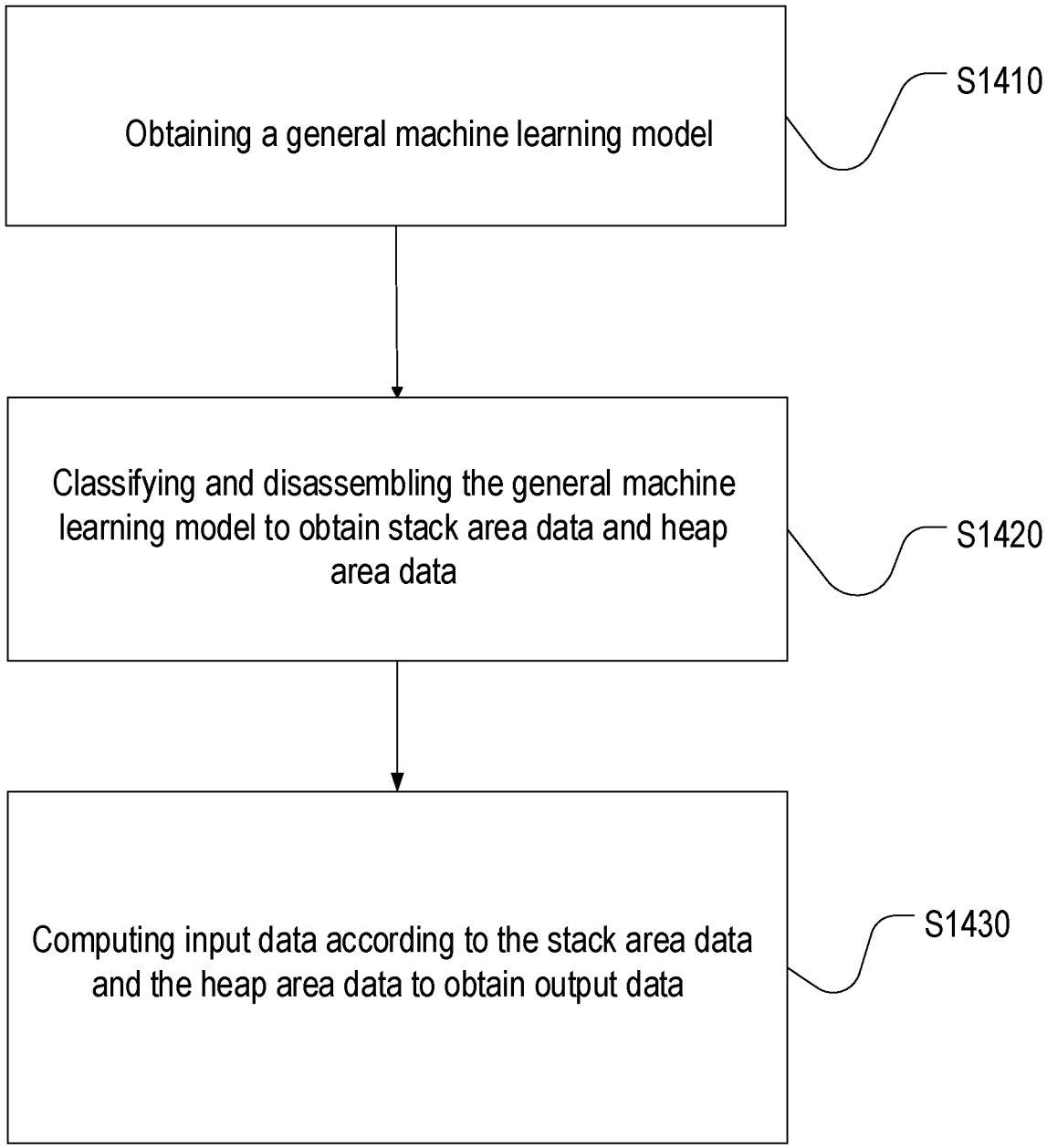
FIG. 4 is a flowchart of a method for executing a general machine learning model according to another example of the present disclosure.

In an example, referring to FIG. 4, a method for executing a general machine learning model is provided. In an example, the method for executing a general machine learning model includes:

a step S1410, obtaining a general machine learning model;

Specifically, the general machine learning model refers to a general machine learning model generated based on the above method for generating a general machine learning model. Specific descriptions of the method for generating a general machine learning model will not be described further herein. For details, please refer to the above descriptions.

The method for executing a general machine learning model further includes: a step S1420, classifying and disassembling the general machine learning model to obtain stack area data and heap area data.

Specifically, the classifying and disassembling operation is performed according to different data types. Specifically, the stack data refers to data that cannot be shared among cores in a multi-core development platform, and the heap data refers to data that can be shared among cores in a multi-core development platform. In an example, the step S1420 of classifying and disassembling the general machine learning model to obtain the stack data and the heap data includes: a step S14210, disassembling shareable data in the general machine learning model into the stack data; and a step S14220, disassembling unshareable data in the general machine learning model into the heap data.

In an example, the method further includes allocating the stack data to a stack area. Specifically, the stack area refers to a storage space mainly used to store the stack data in the memory. Optionally, the data stored in the stack area also includes intermediate results generated during the machine learning operation.

In an example, the method further includes allocating the heap data to a heap area. Specifically, the heap area refers to a storage space mainly used to store the heap data in the memory. Optionally, the data stored in the heap area also includes intermediate results generated during the machine learning operation. Specifically, the heap area data includes data stored in the heap area, such as heap data and layout information of each heap data block.

The method for executing a general machine learning model further includes: a step S1430, computing according to input data, the stack area data, and the heap area data to obtain output data. Specifically, the computing process of the step S1430 is performed by a hardware computing unit. After the step S1403, a neural network processor controls the hardware computing unit to shut down. Specifically, the hardware computing unit is composed of an arithmetic logic unit, an accumulator, a status register, a general register group, and the like. Basic functions of the arithmetic logic operating unit include four fundamental operations: addition, subtraction, multiplication, and division; logical operations such as AND, OR, NOT, XOR; and operations such as shift and complement. It can be understood that the hardware computing unit can directly perform an operation by fetching the stack area data and the heap area data instead of waiting for the machine learning algorithm to be compiled. Therefore, through the general machine learning model, the operating efficiency of a machine learning algorithm can be improved.

In an example, the stack data includes model parameter stack data;

In an example, the step S14230 of allocating stack data to the stack area further includes:

a step S14231, obtaining a size of a space required for the model parameter stack data and a size of an intermediate result temporary storage space. Specifically, a storage address and a storage space are allocated for the model parameter stack data and the intermediate result temporary storage space according to the size of the space required for the model parameter stack data and the size of the intermediate result temporary storage space.

The step S14230 of allocating stack data to the stack area further includes:

a step S14232, computing a sum of the size of the storage space required for the model parameter stack data and the size of the intermediate result temporary storage space to obtain a size of a first storage space. It can be understood that the model parameter stack data produces intermediate results during the machine learning operation. Therefore, the sum of the size of the storage space required for the model parameter stack data and the size of the intermediate result temporary storage space is a minimum storage space allocated to the model parameter stack area by the memory In an example, a step S14233 includes: allocating a storage space of the model parameter stack area, where the size of the storage space of the model parameter stack area is greater than or equal to the size of the first storage space. Specifically, the model parameter stack area refers to a storage area mainly used to store the model parameter stack data.

In an example, the heap data that is changed during the operation phase is stored as model parameter dynamic heap data, and the heap data that is not changed during the operation phase is stored as model parameter static heap data. Specific descriptions of the model parameter stack data and the model parameter heap data will not be described further herein. For details, please refer to related content in the above method for generating a general model.

In an example, the step S14240 of allocating the heap data to the heap area further includes: a step S14241, obtaining a size of a storage space required to obtain model parameter dynamic data; a step S14242, allocating the model parameter dynamic data to a model parameter dynamic heap area; and a step S14243, allocating the model parameter static data to the model parameter static heap area.

In an example, the step S14242 of allocating the model parameter dynamic data to a dynamic data heap area further includes:

a step S142421, adding the storage space of the model parameter dynamic data, a storage space of input data, and a storage space of output data to obtain a size of a second storage space; and a step S142422, allocating the storage space of the model parameter dynamic heap area, where the storage space of the model parameter dynamic heap area is greater than or equal to the size of the second storage space. The step S142422 enables the storage space to be more expandable when normal operations are guaranteed.

In an example, the step S14240 of allocating the heap data to a heap area to obtain heap area data further includes:

allocating the model parameter dynamic heap area and the model parameter static heap area to a section of continuous storage space to obtain a heap area with continuous storage space. In an example, data in the heap area includes the model parameter dynamic data, the model parameter static data, the input data, and the output data.

In an example, the model parameter static data includes task instruction heap data. Specifically, the task instruction heap data refers to task instruction data that can be shared among cores.

In an example, the storage space of the model parameter static heap area is greater than or equal to the storage space of the model parameter static heap data. Specifically, the storage space of the model parameter static heap area is greater than or equal to the size of the storage space required for the model parameter static data. This example enables the model parameter static heap area to be more expandable when normal operations are guaranteed.

In an example, the step of computing according to input data, the stack area data, and the heap area data to obtain output data further includes: after computing the input data, shutting down a hardware computing unit. Specifically, shutting down the hardware computing unit may help reduce occupation of computer resources during the process of machine learning operation.

In an example, the step of computing according to the input data, the stack area data, and the heap area data to obtain output data further includes: extracting the output data in the heap area; transferring the output data to the outside of a development platform. In an example, input data and output data are stored in the heap area. It can be understood that the input data and the output data are stored in the model parameter dynamic heap area.

Figure 5:
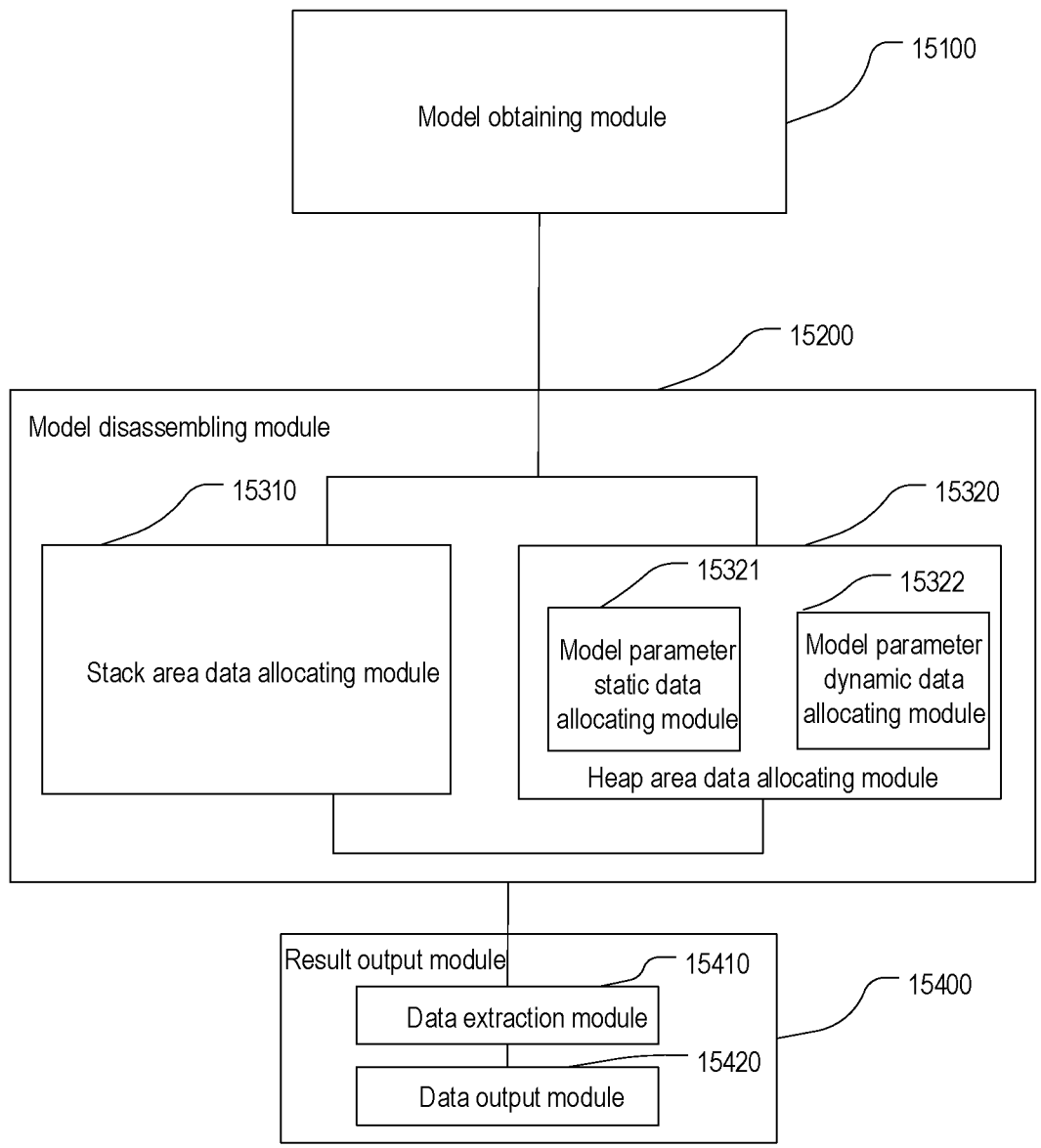
FIG. 5 is a schematic diagram of a device for executing a general machine learning model according to an example of the present disclosure.

In an example, referring to FIG. 5 together, a device for executing a general machine learning model is provided. The device includes:

a model obtaining module 15100 configured to obtain a general machine learning model;

a model disassembling module 15200 configured to classify and disassemble the general machine learning model to obtain stack data and heap data; and a result outputting module 15400 configured to obtain stack area data, heap area data, and input data for computation to obtain output data.

In an example, the stack area data includes stack data, the heap area data includes heap data, and the model disassembling module 15200 includes:

a stack area data allocating module 15310 configured to disassemble shareable data in the general machine learning model into stack data, and optionally, further configured to allocate the stack data to the stack area; and a heap area data allocating module 15320 configured to allocate the heap data to the heap area, and optionally, further configured to disassemble unshareable data in the general machine learning model into heap data.

In an example, the stack data includes model parameter stack data. In an example, a model parameter stack data allocating module includes: a first storage space computing module configured to compute a sum of a size of a storage space required for the model parameter stack data and a size of an intermediate result temporary storage space to obtain a size of a first storage space; a model parameter stack data allocating module configured to allocate a storage space of the model parameter stack area, where the storage space of the model parameter stack area is greater than or equal to the size of the second storage space.

In an example, the stack area data includes stack data, and the heap area data includes heap data. The model disassembling module 15200 includes:

a stack area data allocating module 15310 configured to disassemble unshareable data in the general machine learning model into stack data; a heap area data allocating module 15320 configured to disassemble shareable data in the general machine learning model into heap data. In an example, the stack area data allocating module 15310 is further configured to allocate the stack data to the stack area. In an example, the heap area data allocating module 15320 is further configured to allocate the heap data to the heap area.

In an example, the stack data includes model parameter stack data; and the stack data allocating module is further configured to allocate the model parameter stack data to the model parameter stack area.

In an example, the result outputting module 15400 further includes:

a data extraction module 15410 configured to extract the output data from the heap area; and a data outputting module 15420 configured to output the output data. Specific limitations on the device for executing a general machine learning model will not be described further herein. For details, please refer to the limitations on the method for executing a general machine learning model. Each module in the device for executing a general machine learning model may be implemented in whole or in part by software, hardware, and a combination of software and hardware. The each module can be embedded in the form of hardware in a processor, or be independent of a processor in a computer device, or be stored in the form of software in a memory of a computer device, so as to facilitate the processor to call a module and perform an operation corresponding to the module.

Figure 6:
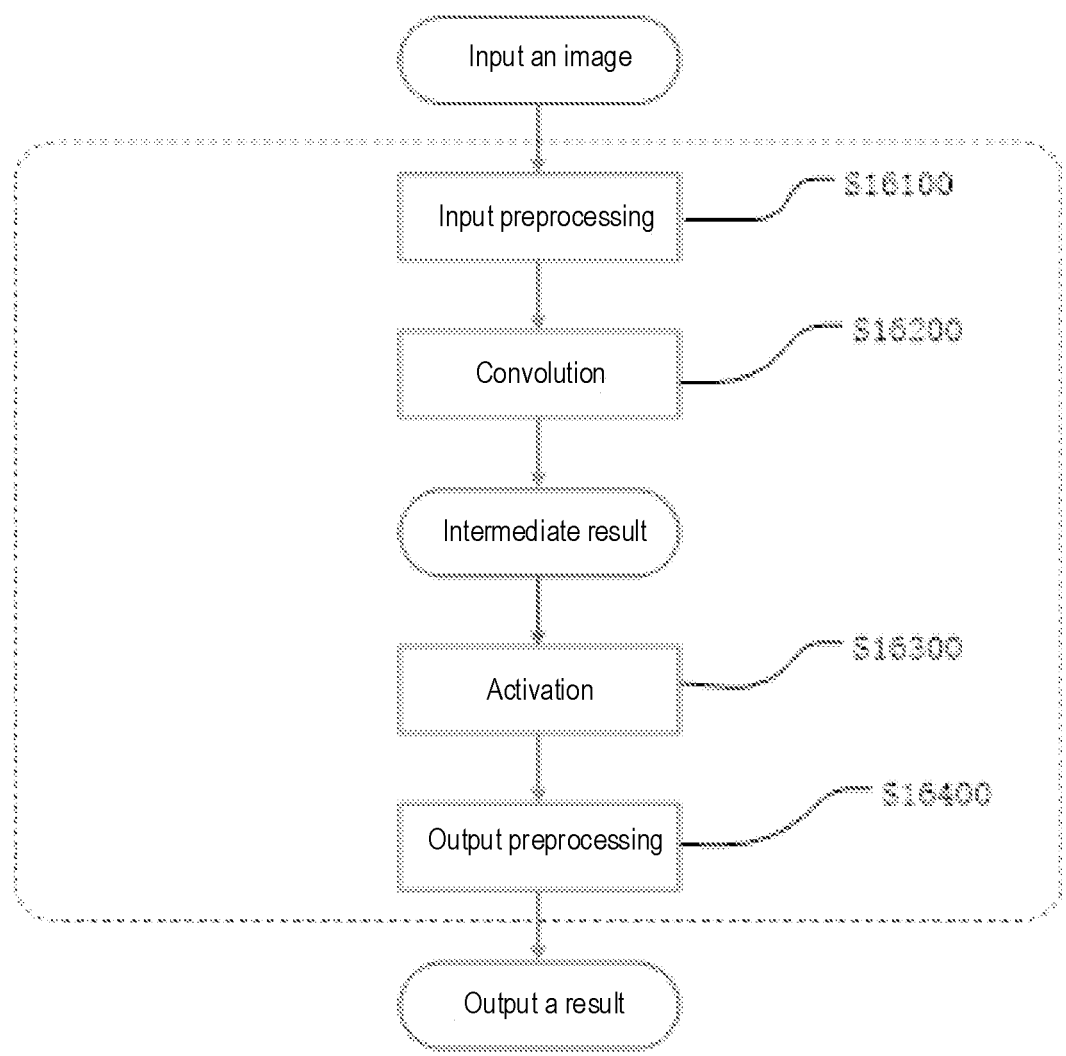
FIG. 6 is a flowchart of a feature extraction process for a jpg image by using a general machine learning model according to an example of the present disclosure.

In an example, referring to FIG. 3 and FIG. 6 together, FIG. 6 provides a schematic diagram of a feature extraction process for an image in a jpg format by using a two-layer neural network. In an example, a feature extraction method for an image by using a two-layer neural network includes:

a step S16100, performing an input preprocessing operation on an input image to obtain a processed input image.

In an example, an attribute extraction module 132123 extracts attribute information of the input image, such as a size, a data format, and a compression format information of the input image, and transmits extracted attribute information to a preprocessing layer. Specifically, an input preprocessing layer 6100 restores a jpg compressed image to an uncompressed original image according to the attribute information of the input image, and assigns values to each data point to facilitate processing of the image by a convolution layer 16200.

The feature extraction method for an image by using a two-layer neural network includes: a step S16200, performing a convolution operation on the processed input image to obtain a convolution operation result.

In an example, the convolution layer 16200 performs feature extraction on image information. The general machine learning model generates corresponding task instructions according to hardware information of a machine learning algorithm running platform shown in FIG. 6. When corresponding hardware of the machine learning algorithm running platform is started, the task instructions control the hardware to obtain input data and weight data step by step for the convolution operation until the operation is completed and an intermediate result is obtained. Specifically, the weight data refers to trained data in a general machine learning model. In an example, attributes of an intermediate result temporary space include attributes of the intermediate result, such as a size of the feature map and a size of the storage space occupied. Specifically, an appropriate storage space is requested for the intermediate result according to the attributes of the temporary result temporary space.

The feature extraction method for a picture by using a two-layer neural network further includes: a step S16300, activating the convolution operation result to obtain an activation result.

In an example, an activation layer 16300 selects a sigmoid activation function and maps the convolution result to a range between 0 and 1. Specifically, the general machine learning model has generated corresponding task instructions according to the hardware information of the machine learning algorithm running platform shown in FIG. 6. After the hardware of the machine learning algorithm running platform is started, the task instructions control the corresponding hardware to obtain input data and weight data step by step for the activation operation. In an example, the machine learning algorithm running platform used for performing image recognition in the example lacks a divider while the sigmoid function includes a division operation, thus corresponding parameters are extracted from a hardware-specific parameter set. In an example, reciprocals which requires divisors are prepared in the hardware parameter set in advance.

In an example, when the activation layer 16300 performs the activation operation, the task instructions control the hardware to obtain data for the activation operation, and to obtain parameter data in the hardware-specific parameter set. In an example, the task instructions control the hardware to perform the convolution operation until the convolution operation is completed and output data is obtained.

The feature extraction method for a picture by using a two-layer neural network further includes: a step S16400, performing output preprocessing on the activation result to obtain a final image.

In an example, an output preprocessing layer 16400 performs an output preprocessing operation on output data according to a preset storage format of the image. In an example, an output image is preset to be stored in a jpg format, then the output preprocessing layer 16400 processes the size, the compression format, the data format, and the like of the output image according to the preset format of the output image to obtain the final image.

It should be understood that although the steps in the flowcharts of FIG. 2, FIG. 4, and FIG. 6 are sequentially displayed as indicated by the arrows, these steps are not necessarily performed sequentially in the order indicated by the arrows. Unless explicitly stated in this document, the execution of these steps is not strictly limited, and these steps can be performed in other orders. Moreover, at least some of the steps in FIG. 2 and FIG. 4 may include multiple sub-steps or multiple stages. These sub-steps or stages are not necessarily performed at the same time, but may be performed at different times. The execution order of these sub-steps or stages is not necessarily performed sequentially, but may be performed in turn or alternately with at least a part of other steps or sub-steps or stages of other steps.

Figure 7:
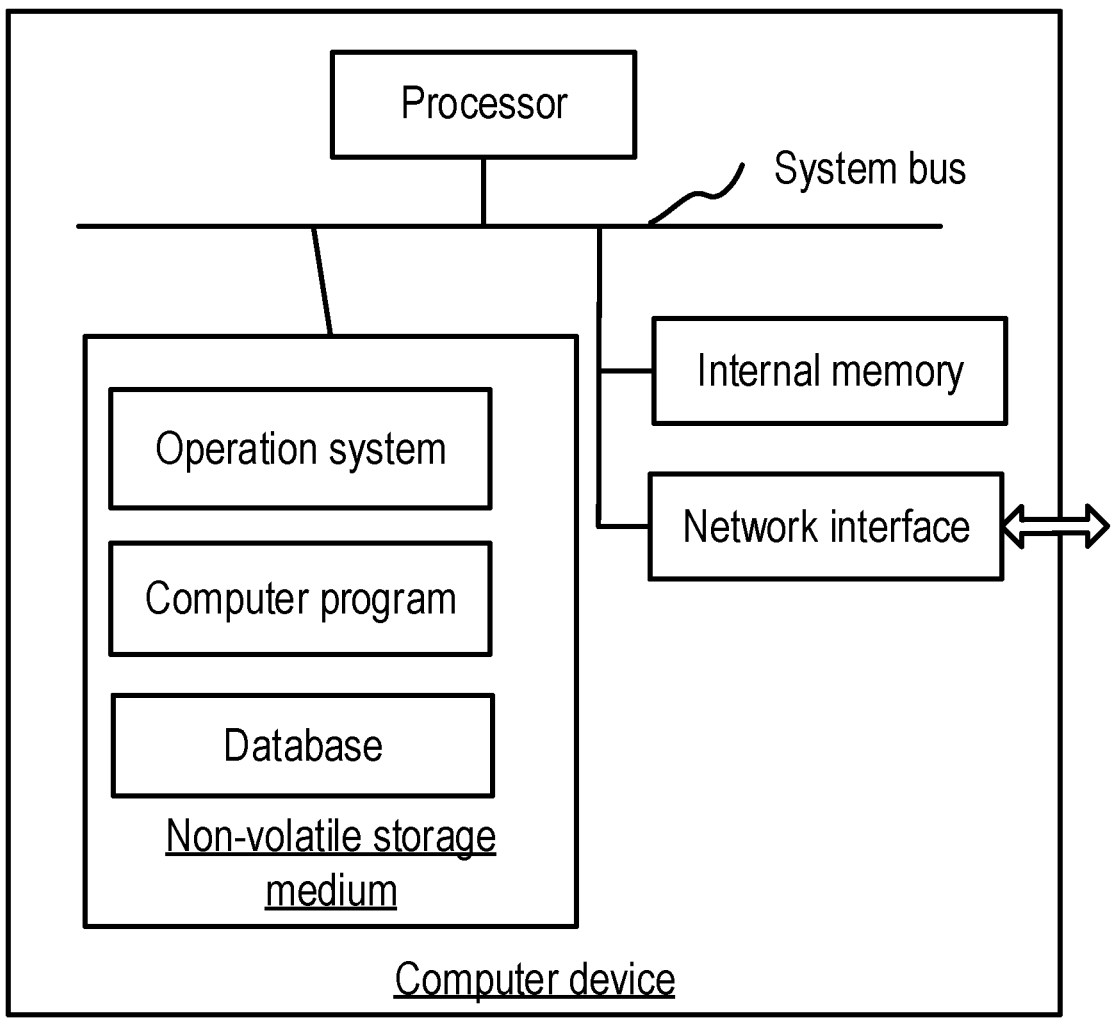
FIG. 7 is an internal structural diagram of a computer device according to an example of the present disclosure.

In an example, a computer device is provided. The computer device may be a server, an internal structure of which may be as shown in FIG. 7. The computer device includes a processor, a memory, a network interface, and a database connected by a system bus. The processor of the computer device is used to provide computation and control capabilities. The memory of the computer device includes a non-volatile storage medium and an internal memory. The non-volatile storage medium stores an operating system, a computer program, and a database. The internal memory provides an environment for operations of the operating system and the computer program stored in the non-volatile storage medium. The database of the computer device is used to store general machine learning model data. The network interface of the computer device is used to communicate with external terminals through a network connection. When the computer program is executed by the processor, a general machine learning model generation method and/or a general machine learning model execution method are implemented.

Figure 8:
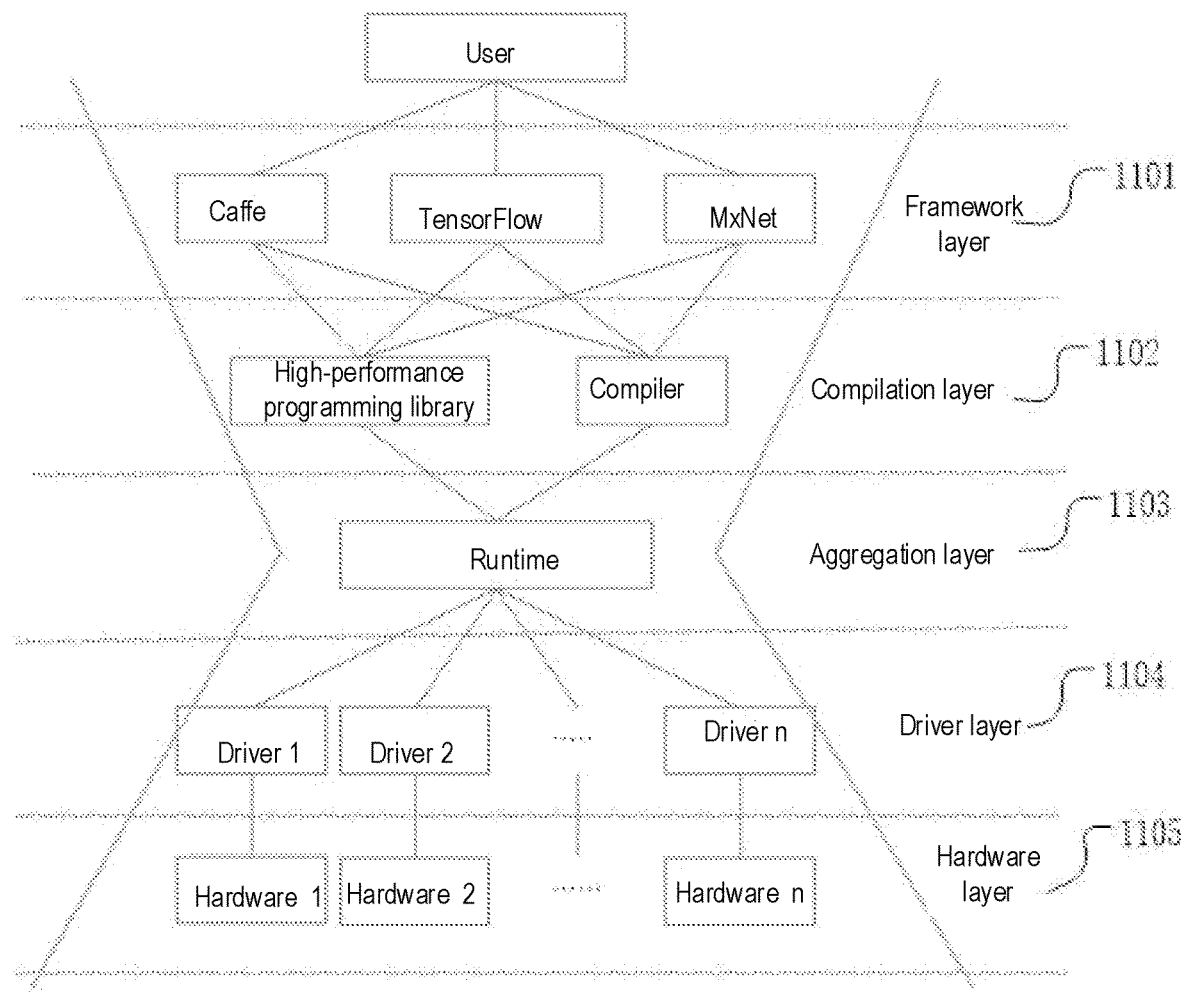
FIG. 8 is an application environment diagram of a method for generating a general machine learning model file according to an example of the present disclosure.

The method for generating a general machine learning model file provided in the present disclosure can be applied to the application environment as shown in FIG. 1. The method for generating a general machine learning model provided in the present disclosure can be applied to an application environment as shown in FIG. 8. The application environment as shown in FIG. 8 is a machine learning development platform, which includes a framework layer 2101, a compilation layer 2102, an aggregation layer 2103, a driver layer 2104, and a hardware layer 2105.

In an example, the framework layer 2101 is configured to provide algorithm design conditions of a machine learning task, and provide convenient training and prediction tools to facilitate users to build their own neural network structures. It can be understood that the framework layer 2101 is configured to: receive user-designed machine learning algorithms (such as neural network structures); parse out parameters of each sub-task, and send the parameters of each sub-task to the compilation layer to generate machine instructions and related necessary elements; and send the machine instructions and the related necessary elements to a runtime layer for computations, and finally complete a machine learning task required by users.

In an example, the compilation layer 2102 is configured to generate machine instructions in a machine learning task. Specifically, the compilation layer includes a compiler, a high-performance programming library specially optimized for high-frequency operators, and other modules, devices, and databases capable of generating machine instructions. It can be understood that the compilation layer 1102 is configured to receive parameters of the machine learning task sent by the upper framework layer 2101, generate binary machine instructions of hardware by compiling, and send the binary machine instructions of hardware to the lower runtime layer for storing or computing.

In an example, the aggregation layer 2103 is configured to further encapsulate driver programs, and can ignore differences between different underlying hardware and drivers to provide a unified program interface to the upper compilation layer 2102 or users. Specifically, the aggregation layer 2103 can encapsulate upper layer software without considering details of the hardware and the drivers. Furthermore, the aggregation layer 2103 is configured to provide a program interface for basic operations of a machine learning task, store and load a machine learning model and necessary elements such as machine instructions required for execution of the machine learning model on hardware. In this case, upper layer software and users only need to focus on the machine learning task rather than consider differences in specific hardware. Optionally, the program interfaces for the basic operations of the machine learning task provided by the aggregation layer may include program interface for memory space allocation, data copy, computation starting, and other basic operations of the machine learning task.

In an example, the driver layer 2104 is configured to package and encapsulate basic operations of a device of the hardware layer 2105, and provide a callable program interface for the upper aggregation layer 2103. Specifically, the basic operations of the driver layer 2104 include controlling input and output of data streams, sending control signals to hardware, receiving and processing abnormal signals generated by the hardware, managing and scheduling multiple tasks, and the like.

In an example, the hardware layer 2105 includes all hardware facilities in the machine learning development platform. Optionally, the hardware layer 2105 includes a primary processor, a coprocessor, a memory, an input/output device, a power supply module, and connecting equipment of the above facilities. It can be understood that the hardware layer 2105 is not limited to the above facilities.

Figure 9:
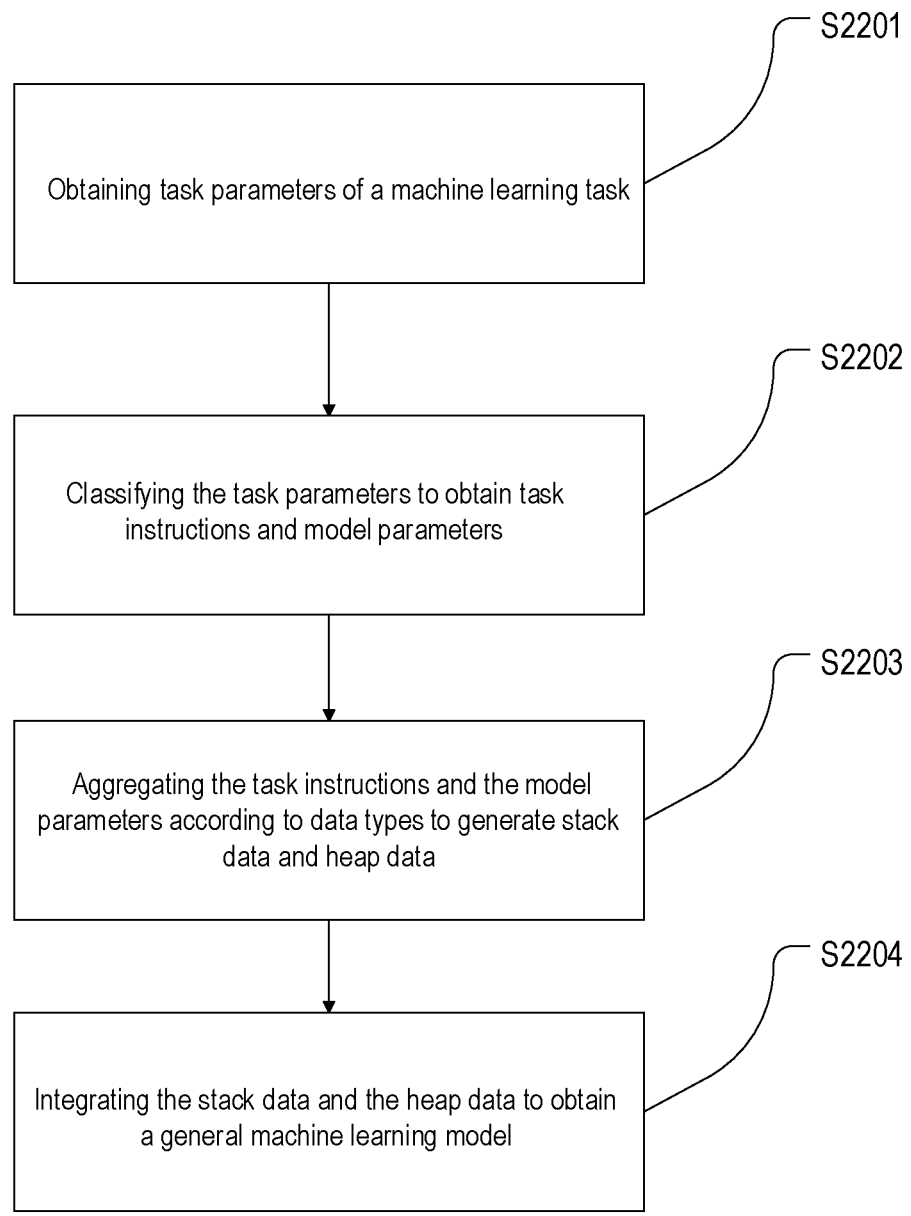
FIG. 9 is a flowchart of a method for generating a general machine learning model according to an example of the present disclosure.
Figure 10:
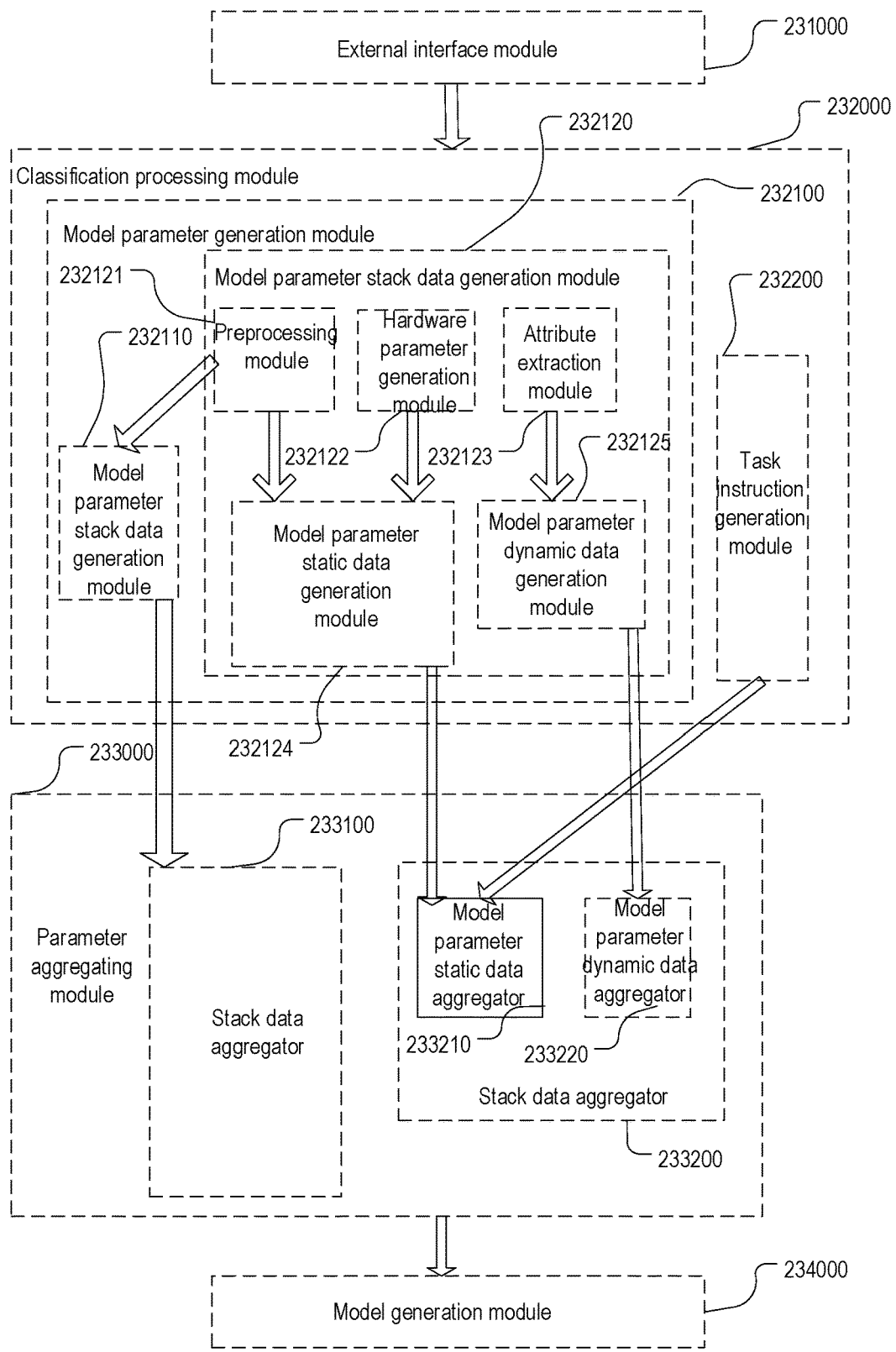
FIG. 10 is a schematic structural diagram of a device for generating a general machine learning model according to an example of the present disclosure.

In an example, referring to FIG. 9 and FIG. 10, a method and a device for generating a general machine learning model are provided. In an example, a step S2201 includes obtaining task parameters of a machine learning task. In an example, the task parameters of the machine learning task are obtained through an external interface module 131000. Specifically, the task parameters refer to parameters required to generate a general machine learning model, and include parameters other than input data and output data. Specifically, the task parameters are obtained from an external program's input, or from a user's input. It can be understood that when the task parameters are obtained from the user's input, the task parameters are generated after the format of the user's input data is converted. In an example, a step S2202 includes classifying the task parameters to obtain task instructions and model parameters. In an example, the model parameters are obtained by a model parameter generation module 232100, and the task instructions are obtained by a task instruction generation module 232200. Specifically, the task instructions refer to compiled task parameters, and the model parameters refer to processing results of other processing of the task parameters required during operation of a machine learning algorithm.

In an example, a step S2203 includes aggregating the task instructions and the model parameters according to data types to generate stack data and heap data. In an example, unshareable data is aggregated by a stack data aggregator 233100, and shareable data is aggregated by a heap data aggregator 233200. It can be understood that unshareable data refers to data that is not shared among cores in a multi-core platform; and shareable data refers to data shared among cores in a multi-core platform. Specifically, aggregating refers to packing and arranging task instructions and model parameters. In an example, a step S2204 includes integrating the stack data and the heap data to obtain a general machine learning model.

Figure 11:
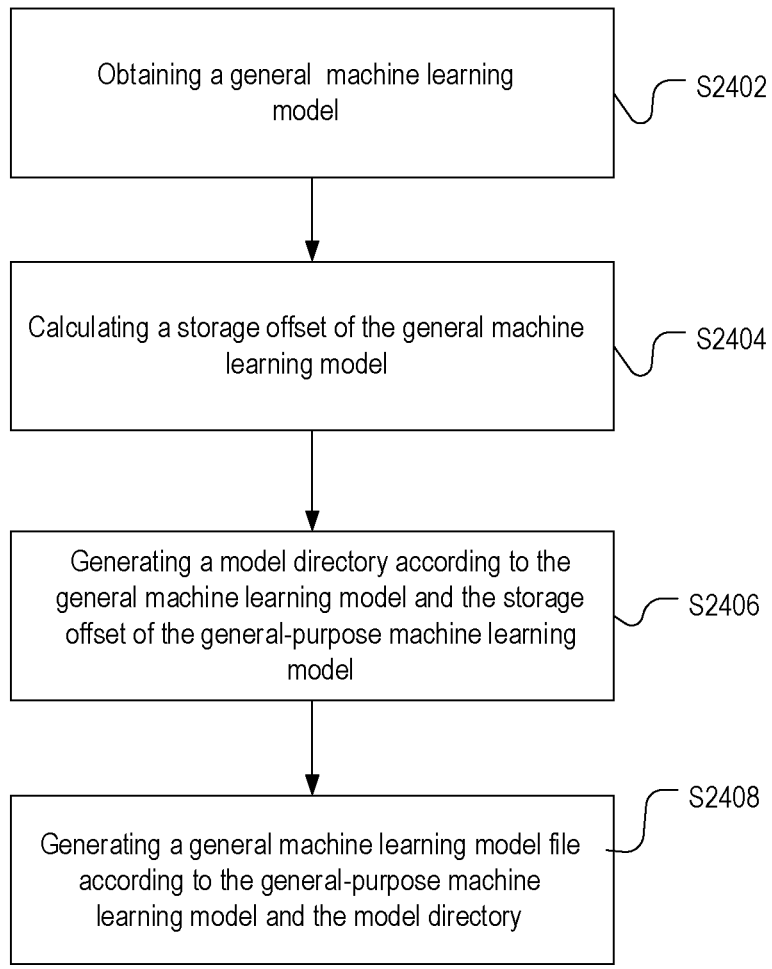
FIG. 11 is a flowchart of a method for generating a general machine learning model file according to an example of the present disclosure.

In an example, referring to FIG. 11 together, a method for generating a general machine learning model file includes:

a step S2402, obtaining a general machine learning model, where the general machine learning model may be a general machine learning model generated through the steps S2201 to S2204, and may also be another model file;

a step S2404, calculating a storage offset of the general machine learning model, where there may be one or more general machine learning models; in an example, when there are a plurality of general machine learning models, the step S2404 includes calculating the storage offset of each general machine learning model;

a step S2406: generating a model directory according to the general machine learning model and the storage offset of the general machine learning model, where the model directory refers to a record of storage locations of all models in the general machine learning model file, and through the model directory, a target model can be quickly located; and a step S2408, generating a general machine learning model file according to the general machine learning model and the model directory. The general machine learning model file in this example not only includes a general machine learning model itself, but also includes a model directory, so that when a general machine learning model in the general machine learning model file is called, a corresponding model can be quickly located and read.

In the above method for generating a general machine learning model file, a general machine learning model file is generated by generating a directory of obtained general machine models, and generating the general machine learning model file according to the general machine learning model and the model directory. Therefore, in a process of machine learning operation, a corresponding general model in a general machine learning model file can be directly read according to operation needs. Therefore, repeated compilations can be avoided, which may greatly improve the efficiency of the implementation of a machine learning algorithm and shorten time spent in a process from compiling to obtaining execution results.

Figure 12:
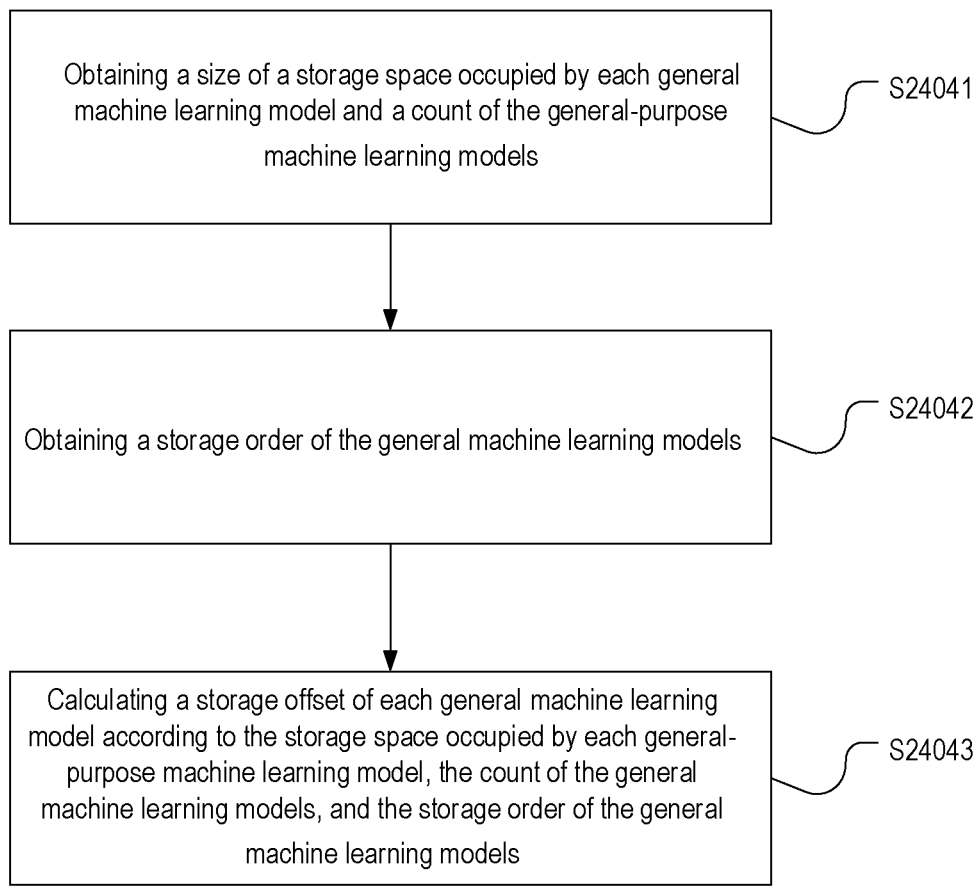
FIG. 12 is a flowchart of calculating a storage offset of the general machine learning model according to an example of the present disclosure.

In an example, referring to FIG. 12 together, the step S2404 of calculating the storage offset of the general machine learning model includes:

a step S24041, obtaining a size of a storage space occupied by each general machine learning model and a count of the general machine learning models, where in an example, a size of a storage space to be occupied by a general machine learning model file is generated according to the size of the storage space occupied by each general machine learning model and the count of the general machine learning models;

a step S24042, obtaining a storage order of the general machine learning models. Specifically, the storage order of the general machine learning models may follow a preset rule, or may be randomly generated. Specifically, after the storage order of the general machine learning models is determined, the general machine learning models are stored according to a determined storage order.

The step S2404 of calculating the storage offset of the general machine learning model further includes: a step S24043, calculating a storage offset of each general machine learning model according to the storage space occupied by each general machine learning model, the count of the general machine learning models, and the storage order of the general machine learning models. The storage offset refers to a relative location of each general machine learning model in the general machine learning model file. For instance, a model A, a model B, and a model C are stored in an order from a file header to a file tailer. The size of the model A is 2 bits, the size of the model B is 3 bits, and the size of the model C is 1 bit, then the offset of the model A is 0, the offset of the model B is 2 bits, and the offset of the model C is 2+3=5 bits.

Figure 13:
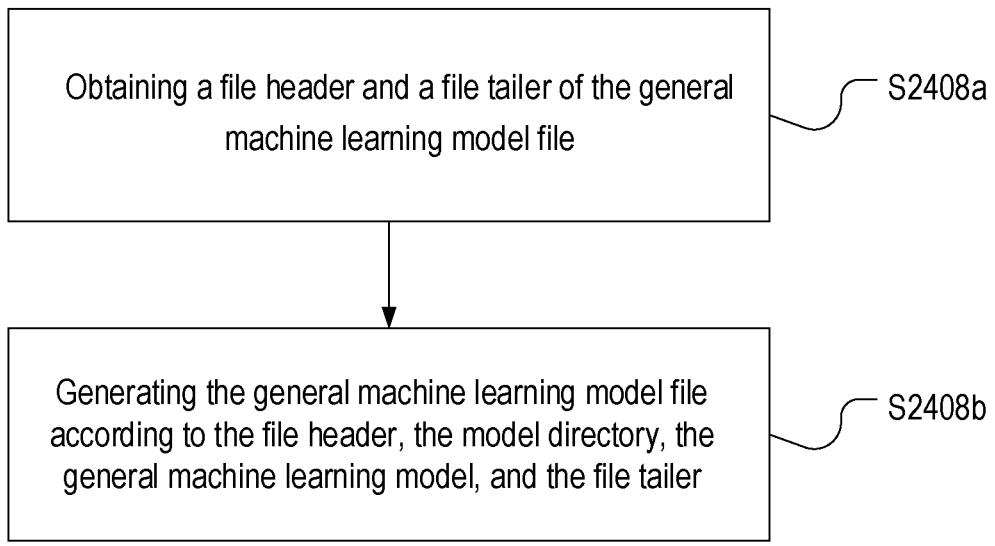
FIG. 13 is a flowchart of generating a general machine learning model file according to the general machine learning model and the model directory according to an example of the present disclosure.

In an example, referring to FIG. 13 together, the step S2408 of generating a general machine learning model file according to the general machine learning model and the model directory includes:

a step S2408*a*, obtaining a file header and a file tailer of the general machine learning model file; and a step S2408*b*, generating the general machine learning model file according to the file header, the model directory, the general machine learning model, and the file tailer. The file header refers to a piece of data for performing a certain task and is located at a beginning of the general machine learning model file, and the file tailer refers to a piece of data for performing a certain task and is located at an end of the general machine learning model file.

Figure 14:
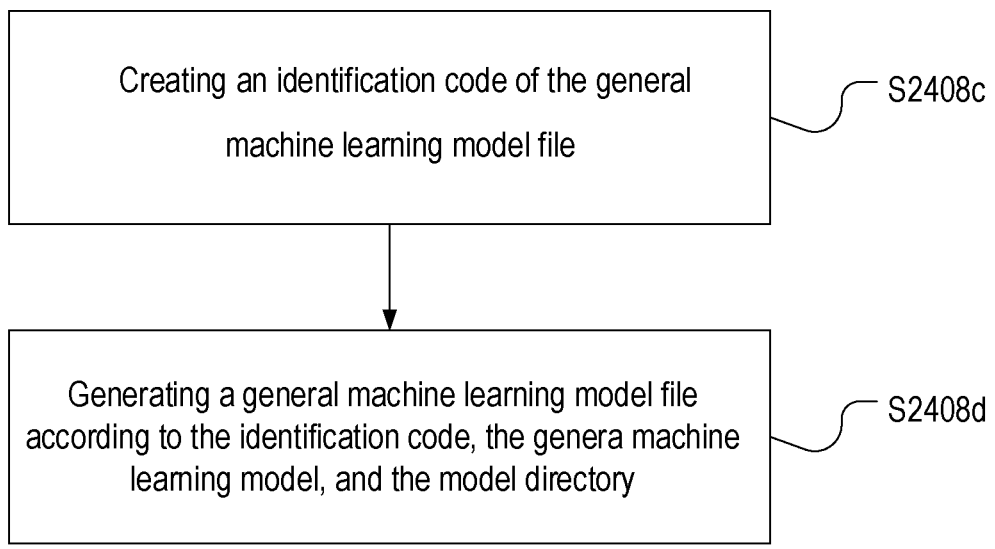
FIG. 14 is a flowchart of generating a general machine learning model file according to the general machine learning model and the model directory according to another example of the present disclosure.

In another example, referring to FIG. 14 together, the step S2408 of generating a general machine learning model file according to the general machine learning model and the model directory includes:

a step S2408*c*, creating an identification code of the general machine learning model file. Specifically, the identification code of the general machine learning model file refers to a character attached to the general machine learning model file for identification. Different general machine learning model files can be distinguished by the identification code of the file, so as to facilitate accurately obtaining of corresponding general machine learning model files.

The step S2408 of generating a general machine learning model file according to the general machine learning model and the model directory further includes: a step S2408*d*, generating a general machine learning model file according to the identification code, the general machine learning model, and the model directory. In an example, the identification code of the general machine learning model file is stored in the file header.

Figure 15:
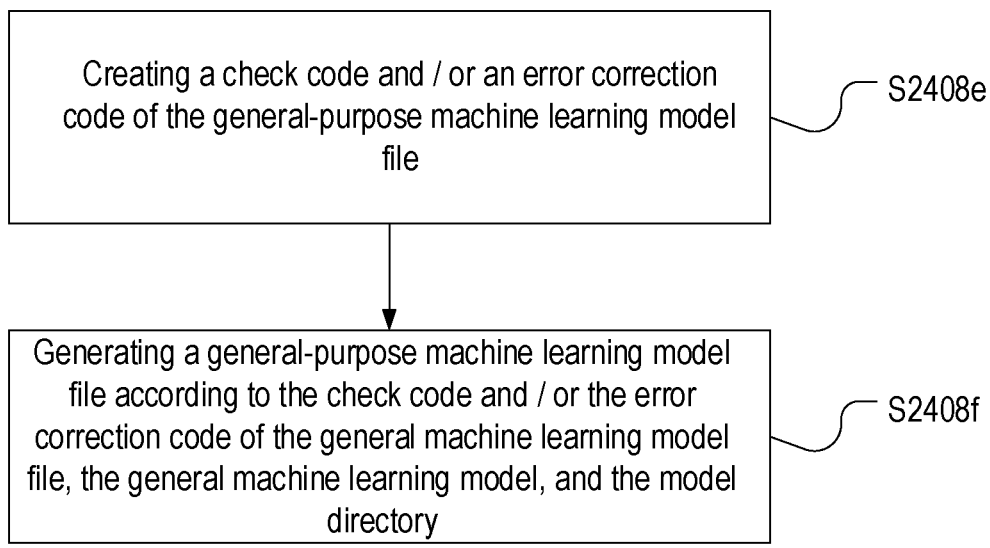
FIG. 15 is a flowchart of generating a general machine learning model file according to the general machine learning model and the model directory according to still another example of the present disclosure.

In yet another example, referring to FIG. 15 together, the step S2408 of generating a general machine learning model file according to the general machine learning model and the model directory includes:

a step S2408*e*, creating a check code and/or an error correction code of the general machine learning model file. The check code is obtained from an operation in a general machine learning model file to verify whether the general machine learning model file is correct. In an example, the check code is located in a last bit in a general machine learning model file. The error correction code refers to a string of characters which are located in a file receiving end and can detect and correct errors that occur during transmission of the general machine learning model file.

Through the steps of the example, security and stability of the general machine learning model file receiving may be increased. When a transmission error occurs during the transmission process, the error can be found in time through the check code, and then be corrected through the error correction code, which may increase stability and fault tolerance of data and prevent consequential errors in subsequent processes due to receiving errors.

The step S2408 of generating a general machine learning model file according to the general machine learning model and the model directory further includes: a step S2408f, generating a general machine learning model file according to the check code and/or the error correction code of the general machine learning model file, the general machine learning model, and the model directory. In an example, the check code and/or the error correction code are stored at the file tailer in the general machine learning model.

Figure 16:
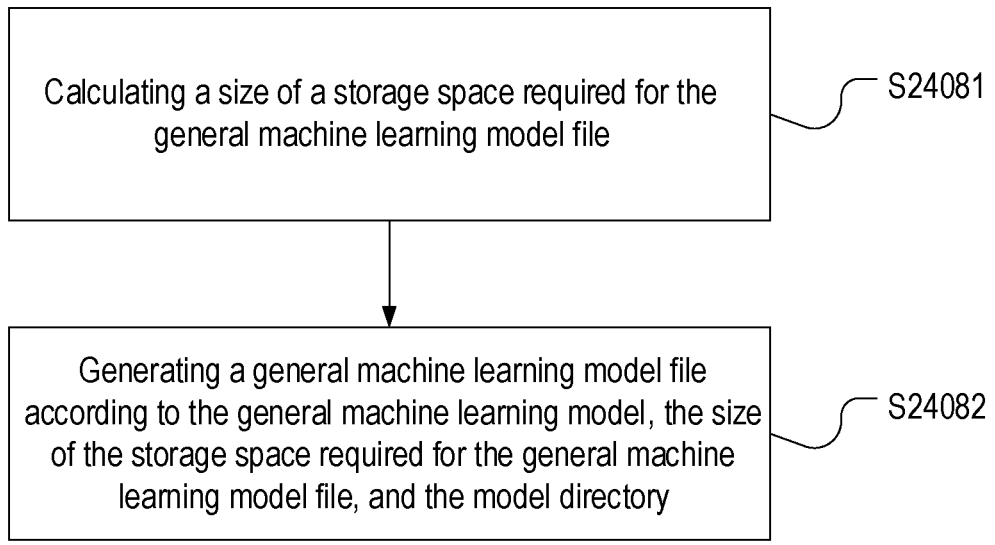
FIG. 16 is a flowchart of generating a general machine learning model file according to the general machine learning model and the model directory according to another example of the present disclosure.

In an example, referring to FIG. 16 together, the step S2408 of generating a general machine learning model file according to the general machine learning model and the model directory further includes:

a step S24081, calculating a size of a storage space required for the general machine learning model file.

In an example, the general machine learning model file includes one or more general machine learning models. In another example, the general machine learning model file further includes a file header, a file tail, and a model directory. Optionally, the general machine learning file may further include a size of a storage space of the model directory and a sum of sizes of storage spaces of the plurality of general machine learning models. Optionally, the general-purpose machine learning file may further include a size of a storage space of the file header, a size of a storage space of the file tail, the size of the storage space of the model directory, and the sum of the sizes of the storage space of the plurality of the general machine learning models.

The step S2408 of generating a general machine learning model file according to the general machine learning model and the model directory further includes: a step S24082, generating a general machine learning model file according to the general machine learning model, the size of the storage space required for the general machine learning model file, and the model directory. In an example, the general machine learning model file, the model directory, and the general machine learning model are sequentially stored from the file head to the file tail.

Figure 17:
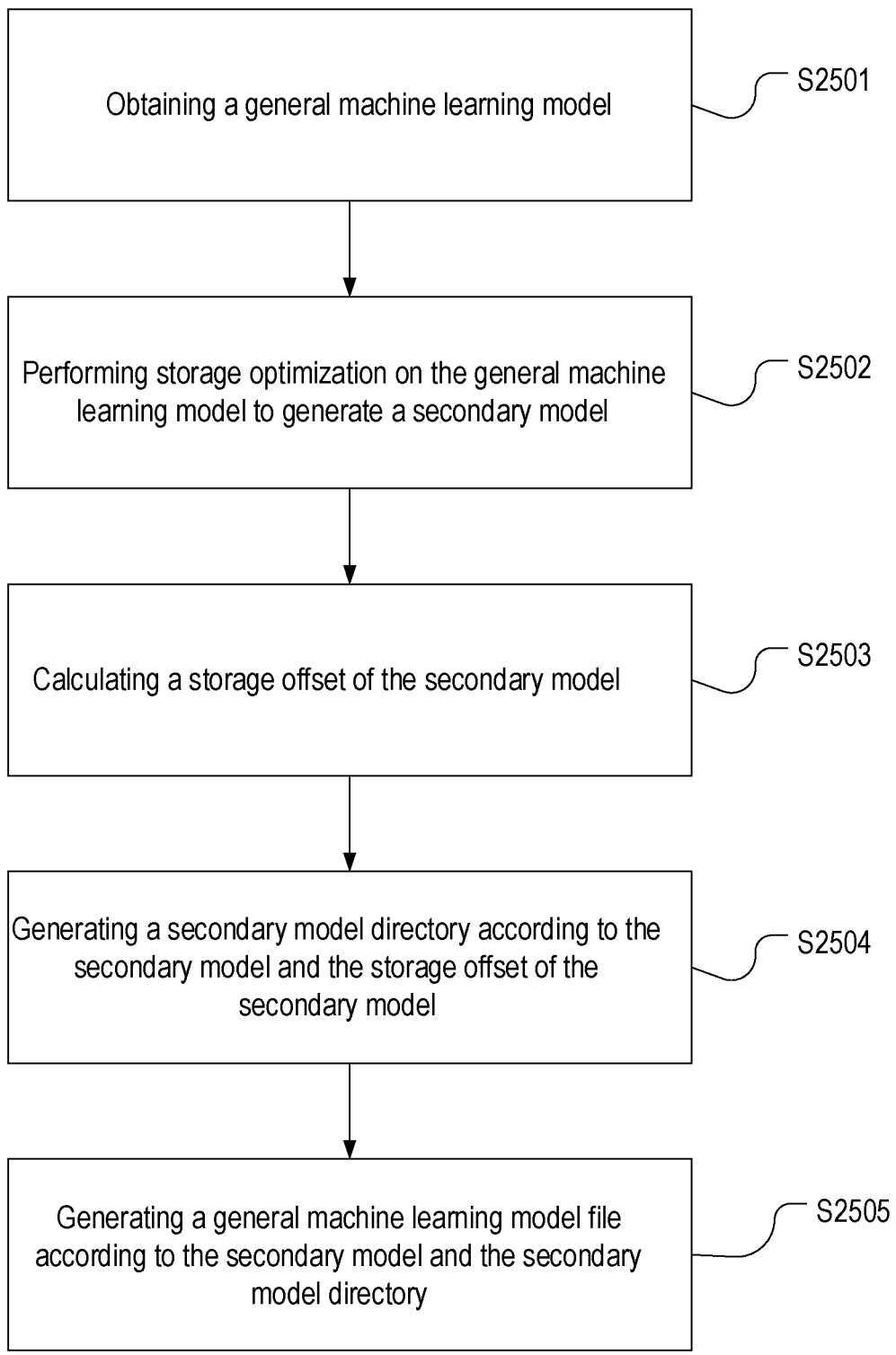
FIG. 17 is a flowchart of a method for generating a general machine learning model according to another example of the present disclosure.

In an example, referring to FIG. 17 together, another method for generating a general machine learning model is provided. The method includes: a step S2501, obtaining a general machine learning model; a step S2502, performing storage optimization on the general machine learning model to generate a secondary model; a step S2503, calculating a storage offset of the secondary model; a step S2504, generating a secondary model directory according to the secondary model and the storage offset of the secondary model; and a step S2505, generating a general machine learning model file according to the secondary model and the secondary model directory.

The execution process of the step S2501 is the same as that of the step S2402 in the above example, thus details of the S2501 will not be described further herein. In addition, a difference between the step S2503 and the step S2404, the step S2504 and the step S2406, and the step S2505 and the step S2408 is an execution object. The execution object of the step S2503, the step S2504, and the step S2505 is the secondary model, while the execution object of the step S2404, the step S2406, and the step of S2408 is the general machine learning model. The execution process of the corresponding steps in the two examples is the same, and details will not be described further herein.

Through the methods of the steps S2501 to S2505, an original generated general machine learning model is optimized to facilitate storage and transmission of a general machine learning model file, which increases security and stability in the transmission process.

In an example, the step S2502 of performing storage optimization on the general machine learning model to generate a secondary model includes: compress the general machine learning model to generate a secondary model. In the example, compressing the general machine learning model may facilitate the general machine learning model to be stored in the general machine learning model file, then a corresponding general machine learning model may be quickly obtained when the corresponding general machine learning model needs to be executed.

In another example, the step S2502 of performing storage optimization on the general machine learning model to generate a secondary model further includes: encrypt the general machine learning model to generate a secondary model. In the example, by encrypting the general machine learning model, security of the general machine learning model during storage and transmission can be increased.

In an example, the generating a machine learning secondary model file according to the secondary model and the secondary model directory includes:

obtaining a file header and a file tailer of the machine learning secondary model file; and generating the machine learning secondary model file according to the file header, the secondary model directory, the general machine learning model, and the file tail.

In an example, the step of calculating a storage offset of the secondary model includes:

obtaining a size of a storage space occupied by each general machine learning model and a count of the secondary models;

obtaining a storage order of the secondary models; and calculating a storage offset of each secondary model according to the size of each storage space occupied by each secondary model, the count of the secondary models, and the storage order of the secondary models.

In an example, the generating a machine learning secondary model file according to the general machine learning model and the model directory includes:

creating an identification code of the machine learning secondary model file; and generating a machine learning secondary model file according to the identification code of the model file, the secondary model, and the secondary model directory.

In an example, the generating a machine learning secondary model file according to the secondary model and the model directory includes:

creating a check code and/or an error correction code of the machine learning secondary model file; and generating a machine learning secondary model file according to the check code and/or the error correction code of the machine learning secondary model file, the secondary model, and the secondary model directory.

The present disclosure provides a method for generating a general machine learning model. The method includes:

obtaining task parameters of a machine learning task;

classifying the task parameters to generate task instructions and model parameters;

aggregating the task instructions and the model parameters according to data types to generate stack data and heap data;

integrating the stack data and the heap data to generate a general machine learning model;

performing storage optimization on the general machine learning model to generate the secondary model; calculating a storage offset of the secondary model;

generating a secondary model directory according to the secondary model and the storage offset of the secondary model; and generating a machine learning secondary model file according to the secondary model and the model directory.

Figure 18:
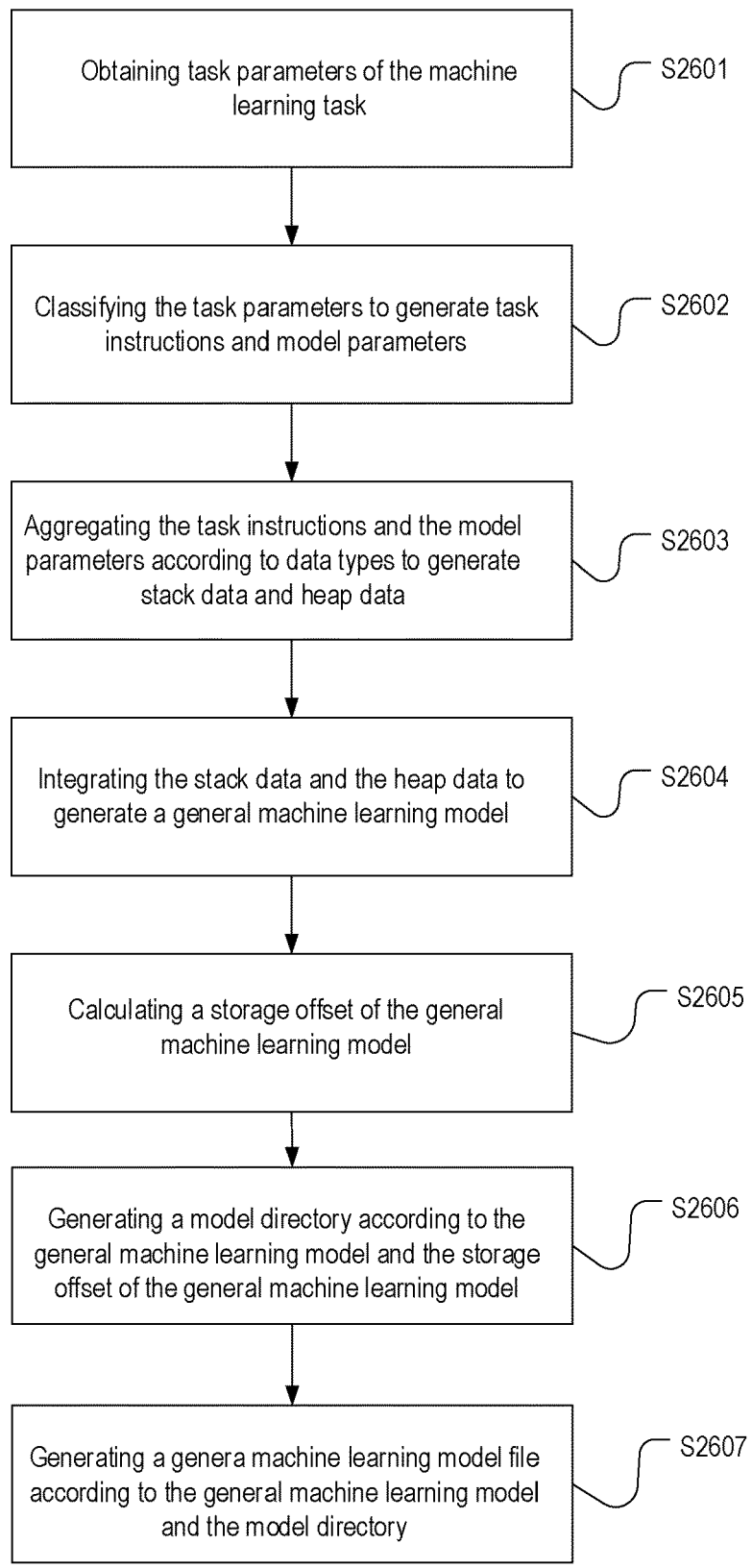
FIG. 18 is a flowchart of a method for generating a general machine learning model according to still another example of the present disclosure.

In another example, referring to FIG. 18 together, another method for generating a general machine learning model is provided. The method includes:

a step S2601, obtaining task parameters of the machine learning task. Specifically, the task parameters refer to parameters required for generating a general machine learning model and include parameters other than input data and output data. Specifically, the task parameters are obtained from an external program's input, or from a user's input. It can be understood that when the task parameters are obtained from the user's input, the task parameters are generated after the format of the user's input data is converted.

The method further includes: a step S2602, classifying the task parameters to obtain task instructions and model parameters. Specifically, the task instructions refer to compiled task parameters, and the model parameters refer to processing results of other processing of the task parameters required during operation of a machine learning algorithm.

The method further includes: a step S2603, aggregating the task instructions and the model parameters according to data types to generate stack data and heap data. It can be understood that unshareable data refers to data that is not shared among cores in a multi-core platform; and shareable data refers to data shared among cores in a multi-core platform. Specifically, aggregating refers to packing and arranging task instructions and model parameters.

The method further includes: a step S2604, integrating the stack data and the heap data to generate a general machine learning model. Specifically, the general machine learning model has good universality. In an example, the general machine learning model is compatible with different upper layer frameworks such as an upper framework layer 2101, a compilation layer 2102, and an aggregation layer 2103, and is also compatible with different lower driver layers and hardware. Further, after a general machine learning model is formed, data blocks can be adjusted according to different numbers of computing cores, addresses of input data, addresses of output data, and other general machine learning models to adapt to different situations.

The method further includes: a step S2605, calculating a storage offset of the general machine learning model; a step S2606, generating a model directory according to the general machine learning model and the storage offset of the general machine learning model; and a step S2607, generating a general machine learning model file according to the general machine learning model and the model directory. The execution process of the steps S2605, S2606, and S2607 in this example is the same as that of the steps S2405, S2406, and S2408 in the above example, thus details of the execution process will not be described further herein.

Figure 19:
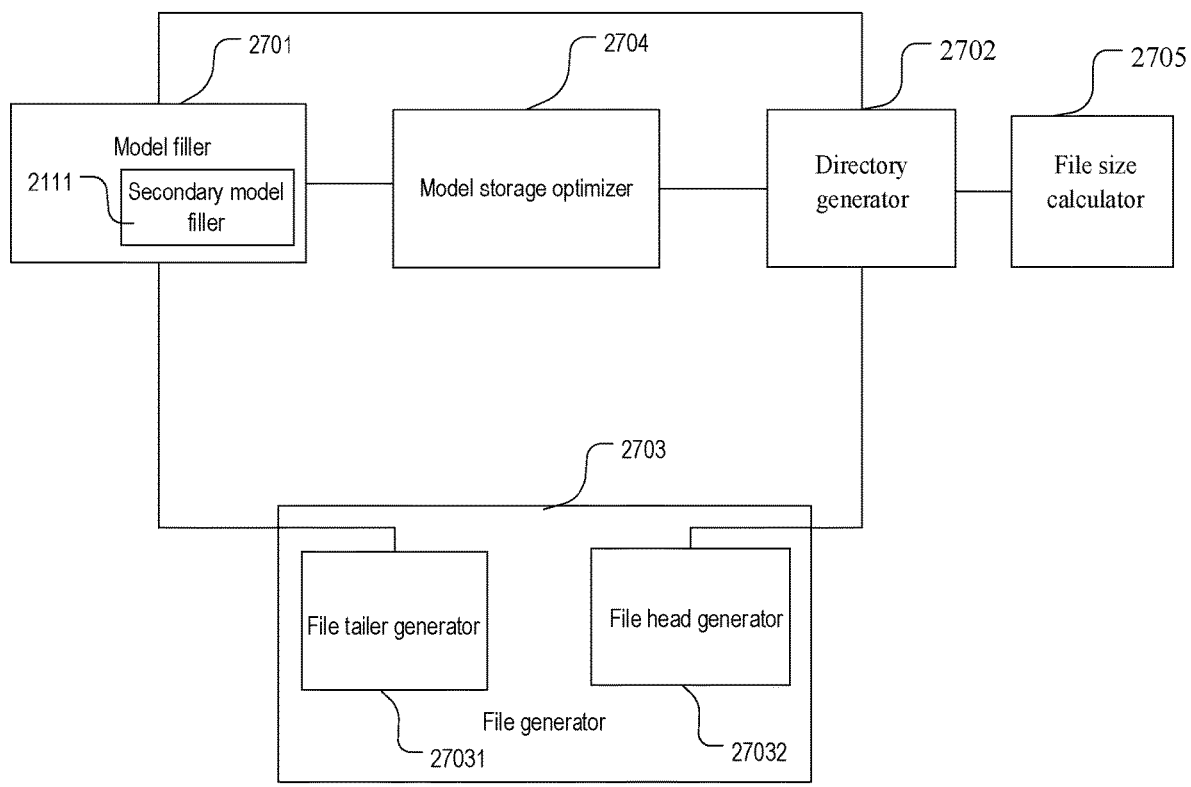
FIG. 19 is a schematic structural diagram of a device for generating a general machine learning model file according to an example of the present disclosure.

In an example, referring to FIG. 19 together, a device for generating a general machine learning model file is provided. The device includes: a model filler 2701, a directory generator 2702, and a file generator 2703, where the model filler 2701 is connected to the directory generator 2702, and the file generator 2703 is connected to the model filler 2701 and the directory generator 2702, respectively. Specifically, the model filler 2701 is configured to obtain the general machine learning model;

the directory generator 2702 is configured to calculate a storage offset of the general machine learning model, and generate a model directory according to the general machine learning model and the storage offset of the general machine learning model; and the file generator 2703 is configured to generate a general machine learning model file according to the general machine learning model and the model directory.

In an example, the model filler 2701 is further configured to sequentially store the general machine learning model into the file generator.

In an example, the file generator 2703 further includes a file header generator 27031 and a file tailer generator 27032. The file header generator 27031 is connected to the directory generator 2702, and the file tailer generator 27032 is connected to the model filler 2701. In an example, the file header generator 27031 is further configured to create an identification code of a general machine learning model file, and generate a general machine learning model file according to the identification code, the general machine learning model, and the model directory.

In an example, the file tailer generator 27032 is further configured to create a check code and/or an error correction code of the general machine learning model file.

In an example, the generation device further includes a model storage optimizer 2704. The model storage optimizer 2704 is connected to the model filler 2701 and the directory generator, and is configured to perform storage optimization on the general machine learning model to generate a secondary model. In an example, a secondary model filler is used to receive the secondary model and sequentially store the secondary model in the file generator.

In an example, the device further includes a file size calculator 2705. The file size calculator 2705 is connected to the directory generator 2702 and is configured to calculate a size of a storage space occupied by the general machine learning model, and calculate a size of a storage space required for the general machine learning model file.

In an example, the file size calculator 2705 is connected to the model storage optimizer 2704. Specifically, the connection relationship in the above example includes an electrical connection or a wireless connection.

Figure 20:
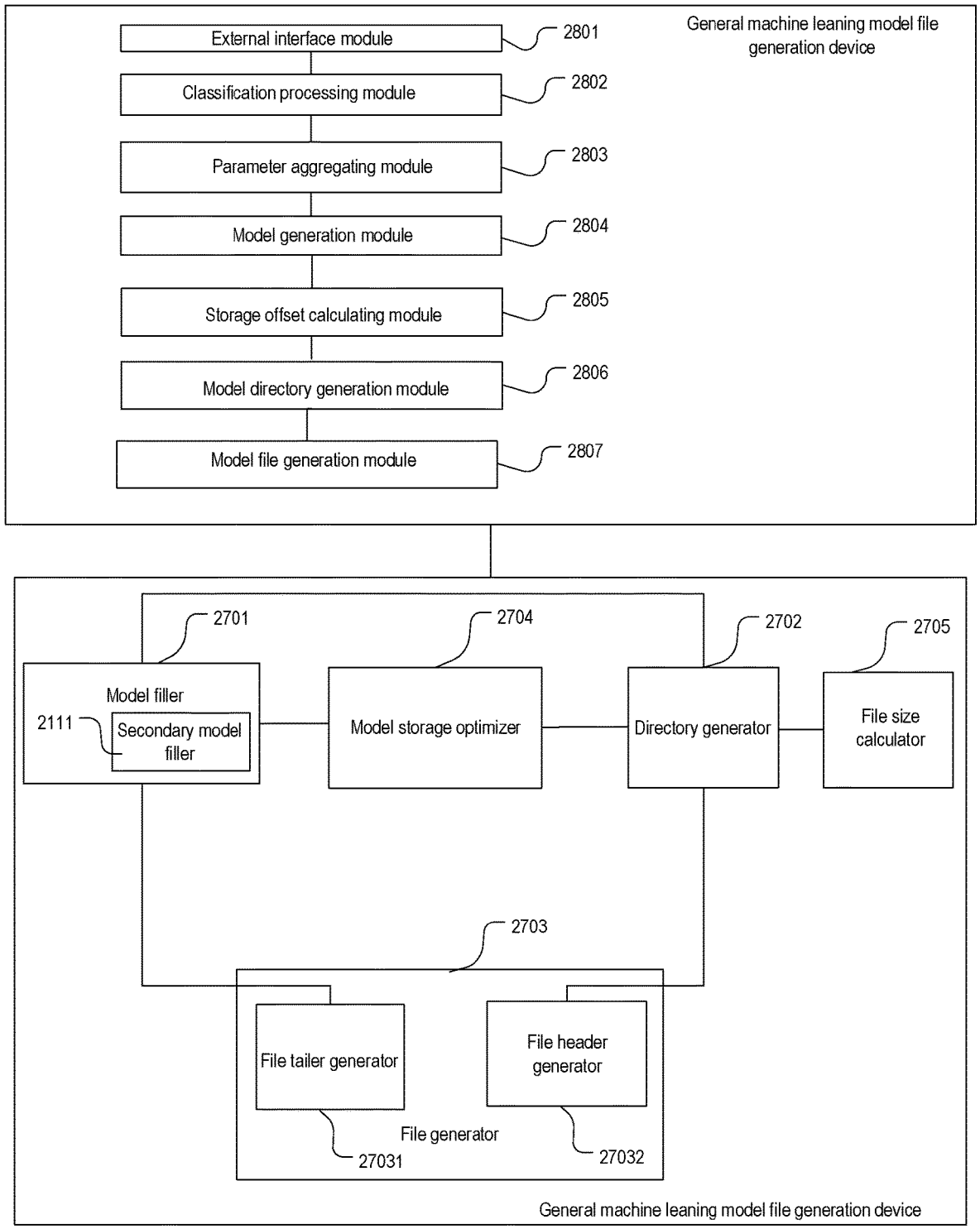
FIG. 20 is a schematic structural diagram of a device for generating a general machine learning model file according to another example of the present disclosure.

In an example, a device for generating a general machine learning model file is provided. Referring to FIG. 20 together, the device includes:

an external interface module 2801 configured to obtain task parameters of a machine learning task;

a classification processing module 2802 configured to classify the task parameters to obtain task instructions and model parameters;

a parameter aggregating module 2803 configured to aggregate the task instructions and the model parameters according to data types to generate stack data and heap data;

a model generation module 2804 configured to integrate the stack data and the heap data to generate a general machine learning model;

a storage offset calculating module 2805 configured to calculate a storage offset of the general machine learning model;

a model directory generation module 2806 configured to generate the model directory according to the general machine learning model and the storage offset of the general machine learning model; and a model file generation module 2807 configured to generate the general machine learning model file according to the general machine learning model and the model directory.

In an example, refer to FIG. 20 together, the device for generating a general machine learning model is connected to the device for generating a general machine learning model file. The device for generating a general machine learning model file generation device is configured to convert a general machine learning model generated in the device for generating a general machine learning model into a general machine learning model file.

Specific limitations on the device for generating a general machine learning model file will not be described further herein. For details, please refer to the limitations on the method for generating a general machine learning model file. Each module in the device for generating a general machine learning model file may be implemented in whole or in part by software, hardware, and a combination of software and hardware. The each module can be embedded in the form of hardware in a processor, or be independent of a processor in a computer device, or be stored in the form of software in a memory of a computer device, so as to facilitate the processor to call a module and perform an operation corresponding to the module.

Figure 21:
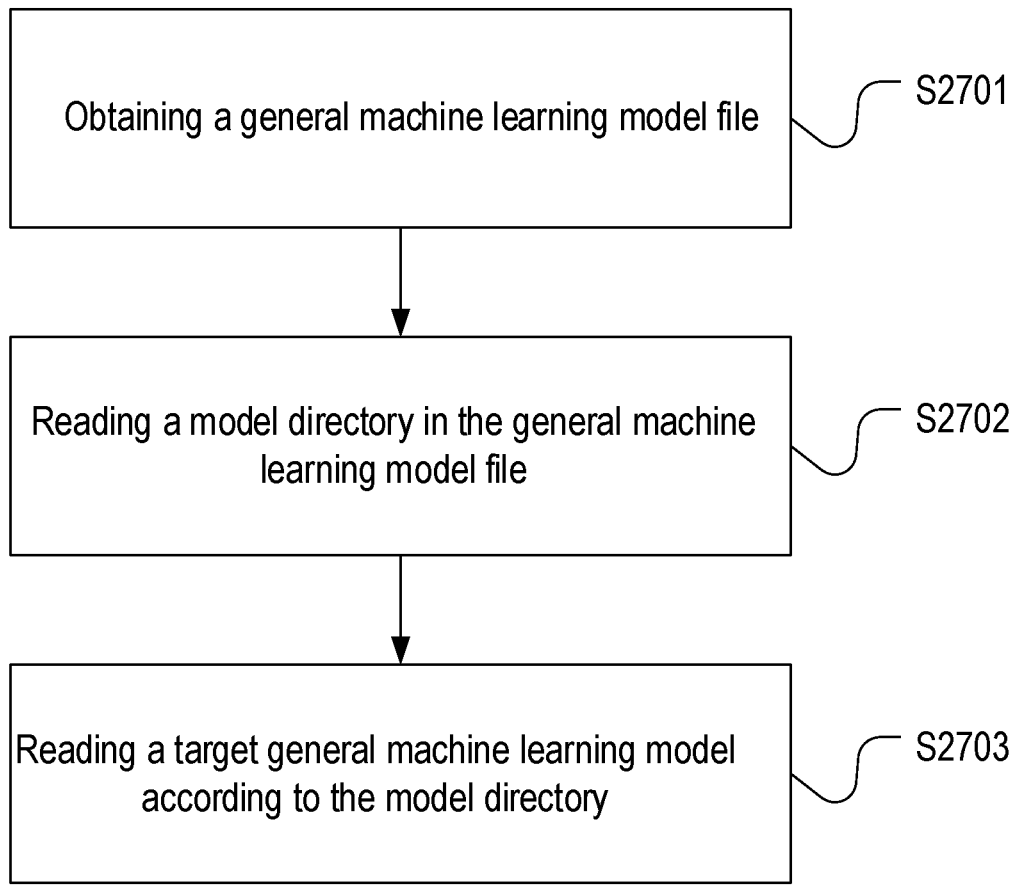
FIG. 21 is a flowchart of a method for parsing a general machine learning model according to an example of the present disclosure.

In an example, referring to FIG. 21 together, a method for parsing a general machine learning model file is provided. The method includes:

a step S2701, obtaining a general machine learning model file, where the general machine learning model file includes a model file generated through the step S2402 to the step S2408. Further, the general machine learning model in the general machine learning file includes the general machine learning model generated through the step S2201 to the step S2204.

The method further includes:

a step S2702, reading a model directory in the general machine learning model file, where the model directory includes the model directory generated through the step S2406; and a step S2703, reading a target general machine learning model according to the model directory. The target general machine learning model refers to a general machine learning model to be extracted from the general machine learning model file. The target general machine learning model may be determined according to users' operation instructions or needs of task execution.

In an example, referring to FIG. 15 together, the step S2701 of obtaining a general machine learning model file includes:

a step S27011, obtain an identification code of the general machine learning model file. Specifically, the identification code of the general machine learning model file may be located at a file header of the general machine learning model file, so as to facilitate identification for the general machine learning model file. Specifically, the identification code of the general machine learning model file refers to a character attached to the general machine learning model file for identification. Different general machine learning model files can be distinguished by the identification code of the file, so as to facilitate accurately obtaining of corresponding general machine learning model files. Further, the identification code may be an identification code of the general machine learning model file created through the step S408c.

The step S2701 of obtaining a general machine learning model file further includes: a step S27012, detecting whether the identification code complies with a preset rule. In an example, the preset rule refers to description information of the identification code of the general machine learning model file obtained before reading a corresponding general machine learning model file. Further, after the general machine learning model file is obtained, the step includes detecting whether the identification code of the general machine learning model file matches the description information. If the identification code of the general machine learning model file matches the description information, the identification code is determined to satisfy the preset rule; and if the identification code of the general machine learning model file does not match the description information, the identification code is determined not to satisfy the preset rule.

The step S2701 of obtaining a general machine learning model file further includes: a step S27013, if the identification code satisfies the preset rule, reading a model directory in the general machine learning model file. Specifically, if the identification code complies with the preset rule, it can be determined that no error occurs during transmission of the general machine learning model file.

In another example, if the identification code does not satisfy the preset rule, the obtained general machine learning model file is inconsistent with a general machine learning model file to be read. Specifically, if the identification code does not satisfy the preset rule, it is determined that an error occurs in the general machine learning model file that is read, then the method for parsing a general machine learning model file is stopped.

Figure 23:
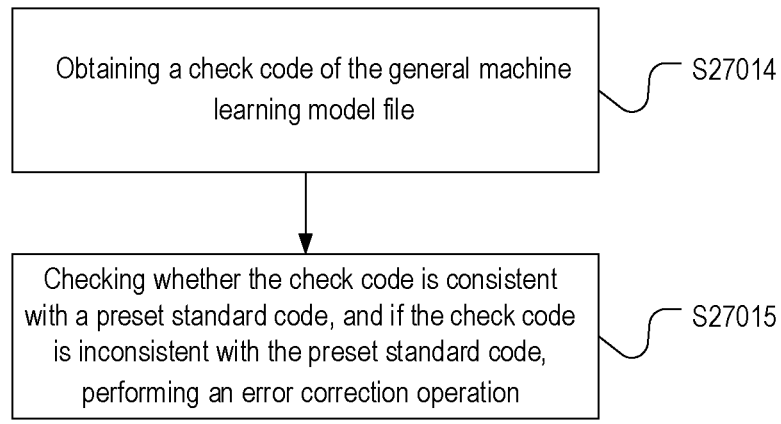
FIG. 23 is a flowchart of obtaining a general machine learning model file according to an example of the present disclosure.

In an example, referring to FIG. 23 together, the step S2701 of obtaining a general machine learning model file includes:

a step S27014, obtaining a check code of the general machine learning model file. Specifically, if the identification code is valid, an obtained general machine learning model file is correct, then the check code of the obtained general machine learning model file is further checked to determine whether content of the general machine learning model file is correct.

The step S2701 of obtaining a general machine learning model file further includes: a step S27015, checking whether the check code is consistent with a preset standard code, and if the check code is inconsistent with the preset standard code, performing an error correction operation. The preset standard code is consistent with the check code when the content of the general machine learning model file is correct. Further, if the obtained check code is consistent with the preset standard code, it can be determined that the content of the general machine learning model file is correct; otherwise, if the obtained check code is inconsistent with the preset standard code, it can be determined that the content of the general machine learning model file is incorrect. Optionally, if the general machine learning model file is incorrect, a cause of errors may be that an original file is incorrect, or that an original file is correct but an error occurs during transmission.

Figure 24:
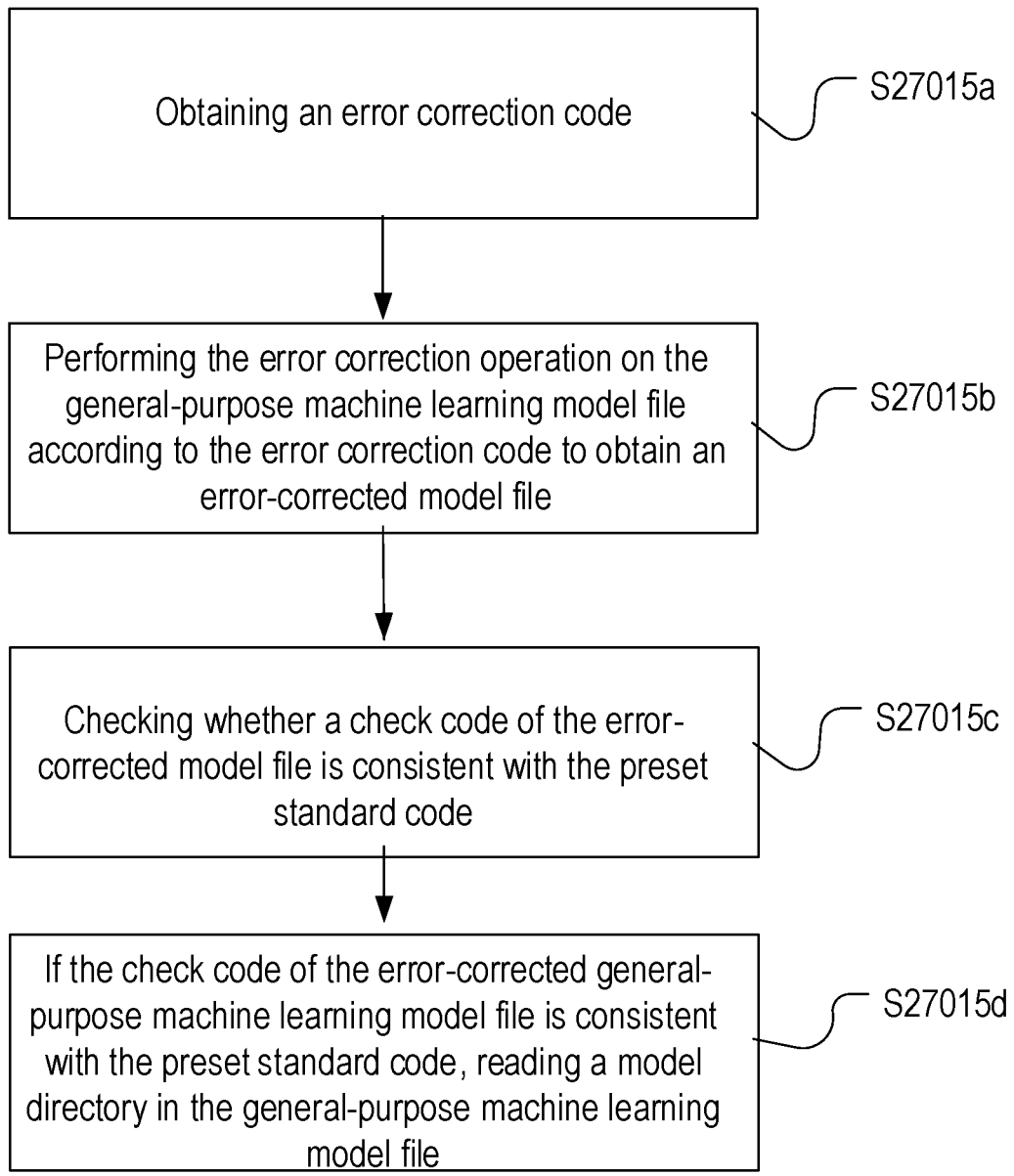
FIG. 24 is a flowchart of performing an error correction operation according to an example of the present disclosure.

In an example, referring to FIG. 24 together, the step S27015 of checking whether the check code is consistent with a preset standard code, and if the check code is inconsistent with the preset standard code, performing an error correction operation includes:

a step S27015a, obtaining an error correction code, where the error correction code may be an error correction code obtained through the step S2408e. Specifically, an error code refers to a string of characters which are located in a file receiving end, and can detect and correct errors that occur during transmission of the general machine learning model file.

The step S27015 further includes: a step S27015b, performing the error correction operation on the general machine learning model file according to the error correction code to obtain an error-corrected model file. Specifically, when the file check code is inconsistent with the preset standard code, after it is determined that an error occurs in content of the general machine learning model file, the error correction operation is performed on the general machine learning model according to the error correction code of the file. Specifically, the error correction code may be located at a file tailer of the general machine learning model file.

The step S27015 of checking whether the check code is consistent with a preset standard code, and if the check code is inconsistent with the preset standard code, performing an error correction operation further includes: a step S27015c, checking whether a check code of the error-corrected model file is consistent with the preset standard code. Specifically, the step includes: after the error correction operation is completed, rechecking whether the check code of the error-corrected model file is consistent with the preset standard code to check an error correction effect.

The step S27015 further includes: a step S27015d, if the check code of the error-corrected general machine learning model file is consistent with the preset standard code, reading a model directory in the general machine learning model file. It can be understood that if the check code of the error-corrected general machine learning model file is consistent with the preset standard code, it can be determined that the error-corrected general machine learning model is correct.

In another example, the method for parsing a general machine learning model file further includes: if the check code of the error-corrected general machine learning model file is inconsistent with the preset standard code, the execution of the method is stopped. It can be understood that if the check code of the error-corrected general machine learning model file is still inconsistent with the preset standard code, it can be determined that the error correction operation fails, and the error-corrected general machine learning model is still incorrect.

Figure 25:
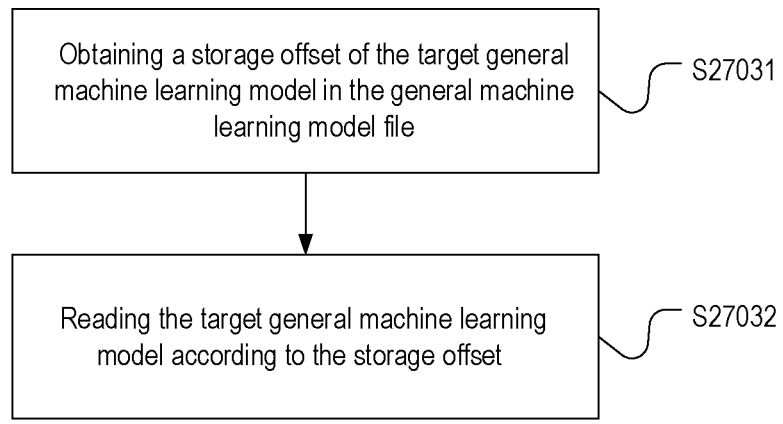
FIG. 25 is a flowchart of reading a target general machine learning model according to the model directory according to an example of the present disclosure.

In an example, referring to FIG. 25 together, the step S2703 of reading a target general machine learning model according to the model directory includes:

a step S27031, obtaining a storage offset of the target general machine learning model in the general machine learning model file. The storage offset refers to a relative location of each general machine learning model in the general machine learning model file. For instance, a model A, a model B, and a model C are stored in an order from a file header to a file tailer. The size of the model A is 2 bits, the size of the model B is 3 bits, and the size of the model C is 1 bit, then the offset of the model A is 0, the offset of the model B is 2 bits, and the offset of the model C is 2+3=5 bits.

The step S2703 of reading a target general machine learning model according to the model directory further includes: a step S27032, reading the target general machine learning model according to the storage offset. In an example, a location of a target general machine learning model in a target general machine learning model file is obtained according to the storage offset, and further, the target general machine learning model is read according to the location of the target general machine learning model file.

Figure 26:
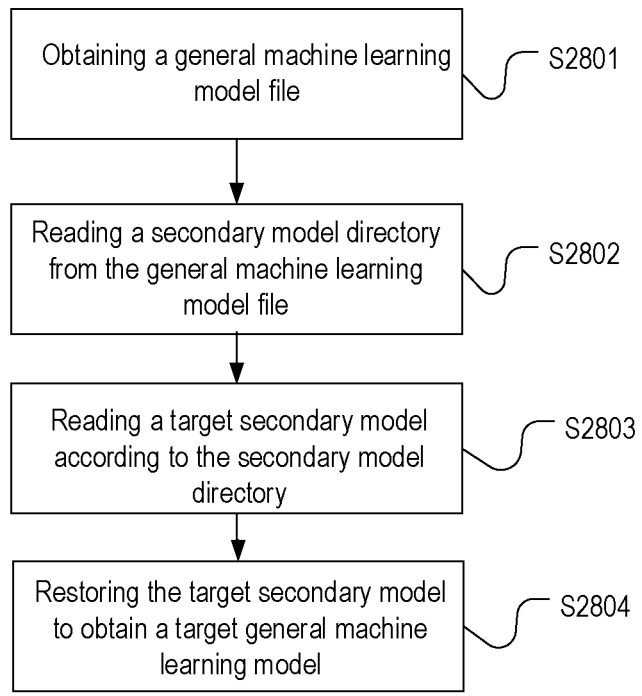
FIG. 26 is a flowchart of a method for parsing a general machine learning model according to an example of the present disclosure.

In an example, referring to FIG. 26 together, a method for parsing a general machine learning model file is provided. The method includes:

a step S2801, obtaining a general machine learning model file. Specifically, an execution process of the step S2801 is the same as that of the above step S2701, thus details of the step S2801 will not be described further herein.

The method further includes:

a step S2802, reading a secondary model directory from the general machine learning model file. Specifically, in the example, a secondary model file is stored in the general machine learning model file. Specifically, a secondary model and the secondary model directory in the example can be generated through the steps S2501 to S2505.

The method further includes:

a step S2803, reading a target secondary model according to the secondary model directory. In an example, the step includes obtaining a storage offset of the target secondary model in the general machine learning model file; and reading the target secondary model according to the storage offset. The target secondary model refers to the general machine learning model to be extracted from the general machine learning model file.

The method further includes: a step S2804, restoring the target secondary model to obtain a target general machine learning model. Specifically, the secondary model is a general machine learning model that has been subjected to a storage optimization processing. In an example, the secondary model is restored according to an operation of the storage optimization processing. For instance, if an operation of the storage optimization processing is encryption, a corresponding restoring operation is to decrypt the secondary model; for another instance, if an operation of the storage optimization processing is compression, a corresponding restoring operation is to decompress the secondary model; and if operations of the storage optimization processing are encryption and compression, corresponding restoring operations are decryption and decompression.

Figure 27:
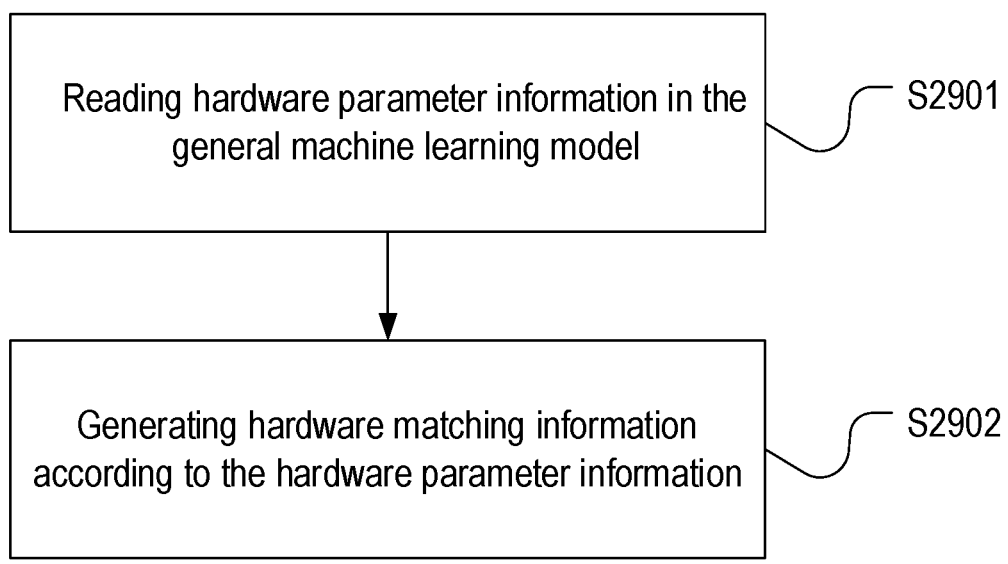
FIG. 27 is a flowchart of a method for parsing a general machine learning model according to another example of the present disclosure.
Figure 28:
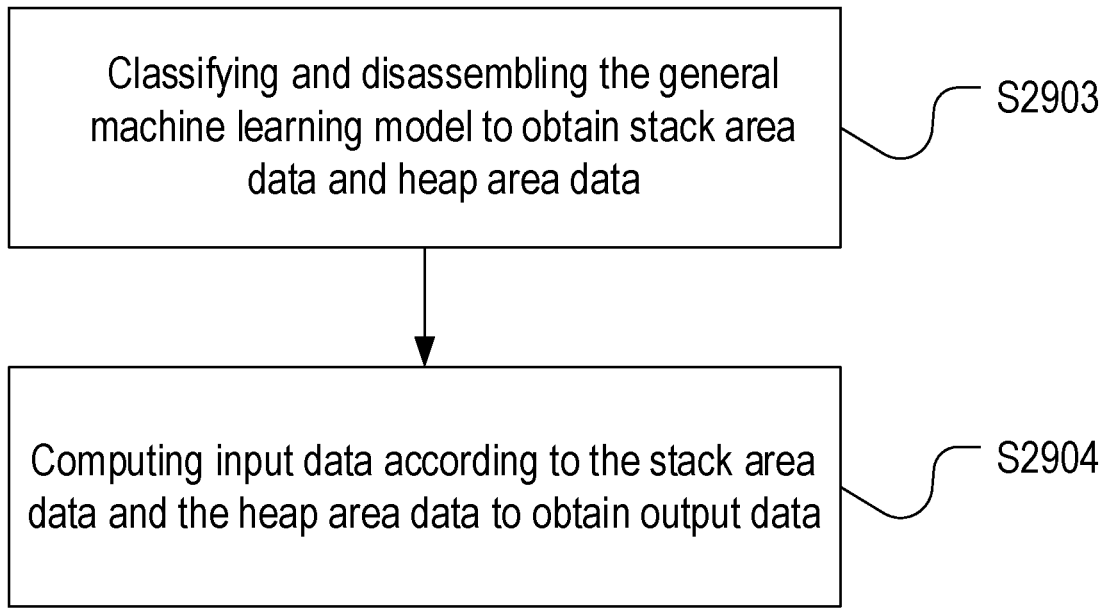
FIG. 28 is a flowchart of a method for parsing a general machine learning model according to another example of the present disclosure.

In an example, referring to FIG. 27 together, the method for parsing a general machine learning model file further includes:

a step S2901, reading hardware parameter information in the general machine learning model, where the hardware parameter information refers to hardware information required when a general machine learning model is performed; and a step S2902, generating hardware matching information according to the hardware parameter information. Specifically, the step includes matching hardware that corresponds to the hardware parameter information in a device pool according to the hardware parameter information. In an example, the device pool may include devices in different hardware platforms. By matching the hardware parameter information in the device pool, the parsing process or the execution process of the general machine learning model may be implemented across platforms. For instance, according to the hardware parameter information, the implementation of a general machine learning model file requires a CPU and a GPU, while the platform only includes a CPU but no GPU, then another platform with a GPU needs to be looked for in the device pool. In this case, hardware equipment in different platforms in the device pool is connected to complete the execution of the general machine learning model.

Figure 22:
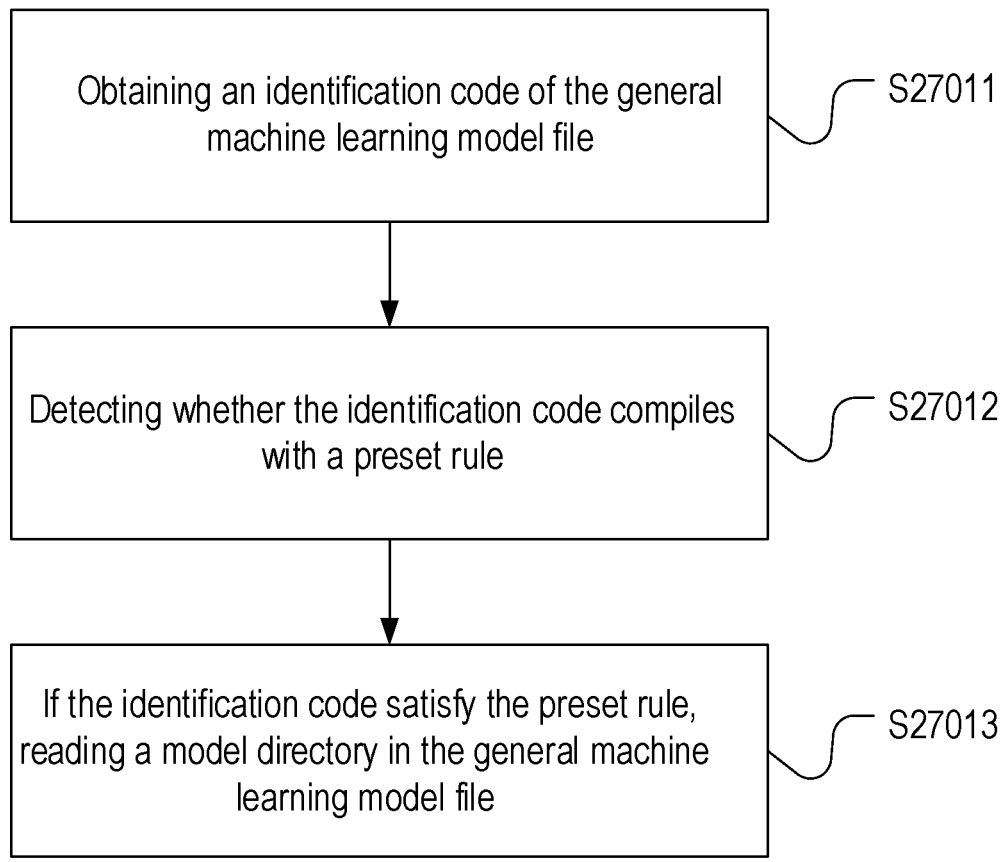
FIG. 22 is a flowchart of obtaining a general machine learning model file according to an example of the present disclosure.

In an example, referring to FIG. 22 together, the method for parsing a general machine learning model file further includes:

a step S2903, classifying and disassembling the general machine learning model to obtain stack area data and heap area data. Specifically, the classifying and disassembling operation is performed according to different data types. Specifically, the stack data refers to data that cannot be shared among cores in a multi-core development platform, and the heap data refers to data that can be shared among cores in a multi-core development platform. In an example, the step S2903 of classifying and disassembling the general machine learning model to obtain stack data and heap data includes: a step S29031, disassembling shareable data in the general machine learning model into the stack data; and a step S29031, disassembling unshareable data in the general machine learning model into the heap data.

The method for parsing a general machine learning model file further includes: a step S2904, computing according to input data, the stack area data, and the heap area data. In an example, the method further includes allocating the stack data to a stack area.

Specifically, the stack area refers to a storage space mainly used to store the stack data in the memory. Optionally, the data stored in the stack area also includes intermediate results generated during the machine learning operation. In an example, the method further includes allocating the heap data to a heap area; specifically, the heap area refers to a storage space mainly used to store the heap data in the memory. Optionally, the data stored in the heap area also includes intermediate results generated during the machine learning operation. Specifically, the heap area data includes data stored in the heap area, such as heap data and layout information of each heap data block.

It should be understood that although the steps in the flowcharts of FIG. 9, FIGS. 11-18, and FIGS. 21-28 are sequentially displayed as indicated by the arrows, these steps are not necessarily performed sequentially in the order indicated by the arrows. Unless explicitly stated in this document, the execution of these steps is not strictly limited, and these steps can be performed in other orders. Moreover, at least some of the steps in FIGS. 9, 11-18, and 21-28 may include multiple sub-steps or multiple stages. These sub-steps or stages are not necessarily performed at the same time, but may be performed at different times. The execution order of these sub-steps or stages is not necessarily performed sequentially, but may be performed in turn or alternately with at least a part of other steps or sub-steps or stages of other steps.

Figure 29:
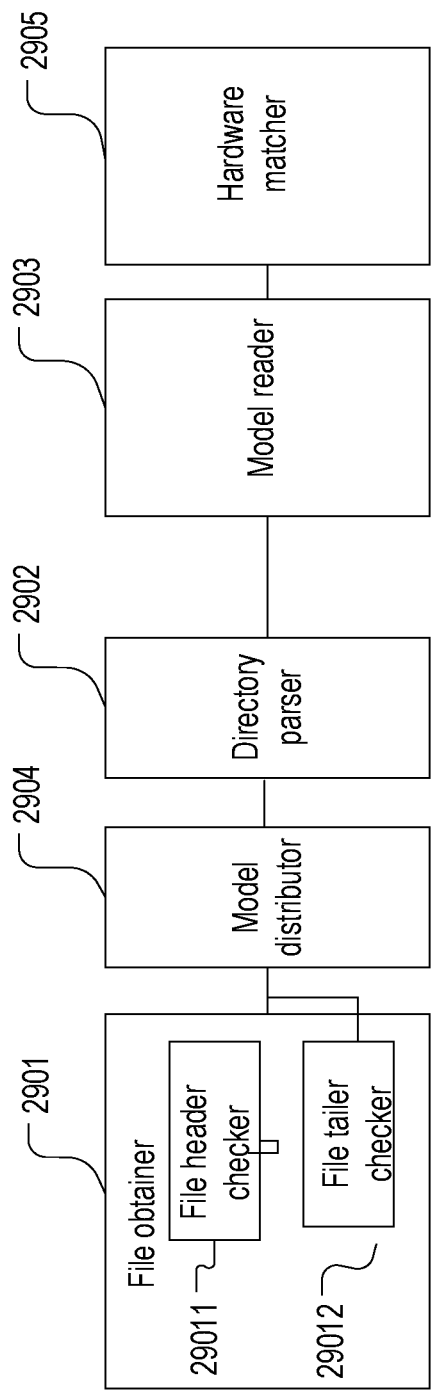
FIG. 29 is a schematic structural diagram of a device for parsing a general machine learning model according to an example of the present disclosure.

In an example, referring to FIG. 29 together, a device for parsing a general machine learning model file is provided. The device includes:

a file obtainer 2901, a directory parser 2902, and a model reader 2903, where the directory parser 2902 is connected to the file obtainer 2901 and the model reader 2903 respectively.

The file obtainer 2901 is configured to obtain a general machine learning model file.

The directory parser 2902 is configured to read a model directory in the general machine learning model file.

The model reader 2903 is configured to read a target general machine learning model according to the model directory.

In an example, the file obtainer 2901 includes a file header checker 29011, where the file header checker 29011 is configured to obtain an identification code of the general machine learning model file, and detect whether the identification code complies with a preset rule; if the identification code in the file header is valid, the model directory is read from the machine learning model file.

The file header checker is further configured to obtain a check code of the general machine learning model file, and check whether the check code is consistent with a preset standard code; if the check code is inconsistent with the preset standard code, an error correction operation is performed.

In an example, the file obtainer 2901 further includes a file tailer corrector 29012, where the file tailer corrector 29012 is configured to obtain an error correction code of the file tail, perform error correction on the general machine learning model file according to the error correction code to obtain an error-corrected model file, and check whether a check code of the error-corrected model file is consistent with a check code pre-generated by the preset standard code; if the check code of the error-corrected model file is consistent with the check code pre-generated by the preset standard code, the model directory is read in the general machine learning model file.

In an example, the file tailer corrector 29012 is further configured to stop execution of the method if the check code of the error-corrected model file is inconsistent with the preset standard code.

In an example, the model reader 2903 is further configured to obtain an offset of a target general machine learning model in the general machine learning model file, and read the target general machine learning model according to the offset.

In an example, the device for parsing a general machine learning model file further includes a model distributor 2904, where the model distributor 2904 is connected to the directory parser 2902. In an example, the model distributor 2904 is configured to read a secondary model directory in the general machine learning model file, read a target secondary model according to the secondary model directory, and parse the target secondary model to obtain a general machine learning model.

In an example, the device for parsing a general machine learning model file further includes a hardware matcher 2905, where the hardware matcher 2905 is connected to the model reader 2903. The hardware matcher is configured to read hardware parameter information in the general machine learning model, and match corresponding hardware in the device pool according to the hardware parameter information.

Figure 30:
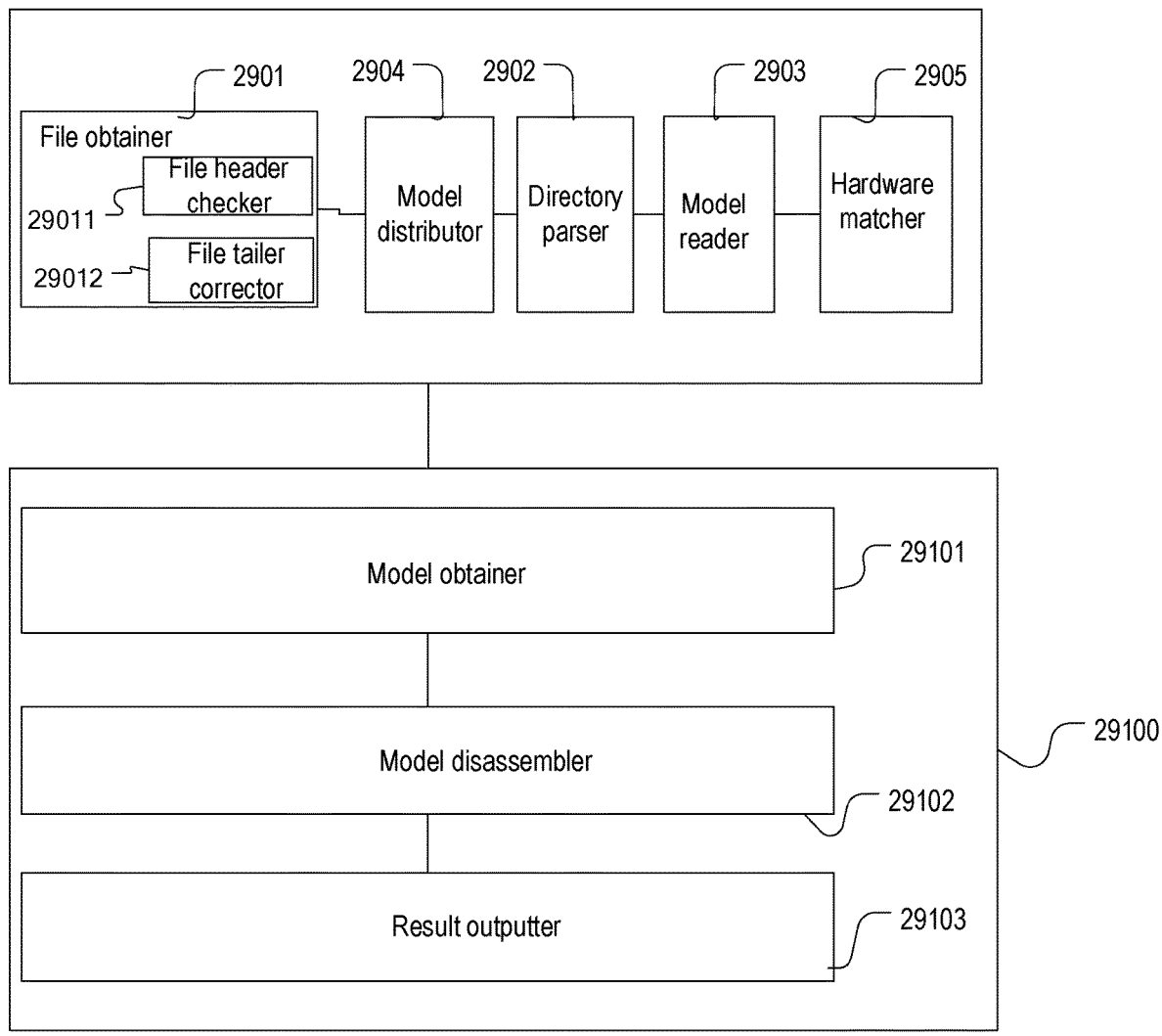
FIG. 30 is a schematic structural diagram of a device for executing a general machine learning model according to an example of the present disclosure.

In an example, the device for parsing a general machine learning model file is connected to the general machine learning execution device 29100. Referring to FIG. 30, the general machine learning execution device includes:

a model obtainer 29101 configured to obtain a general machine learning model;

a model disassembler 29102 configured to classify and disassemble the general machine learning model to obtain stack area data and heap area data; and a result outputter 29103 configured to obtain the stack area data, the heap area data, and compute input data to obtain output data.

Specific limitations on the device for parsing a general machine learning model file will not be described further herein. For details, please refer to the above-mentioned limitations on the method for parsing a general machine learning model file. Each module in the general machine learning model device may be implemented in whole or in part by software, hardware, and a combination of hardware and software. The each module can be embedded in the form of hardware in a processor, or be independent of a processor in a computer device, or be stored in the form of software in a memory of a computer device, so as to facilitate the processor to call a module and perform an operation corresponding to the module.

Figure 31:
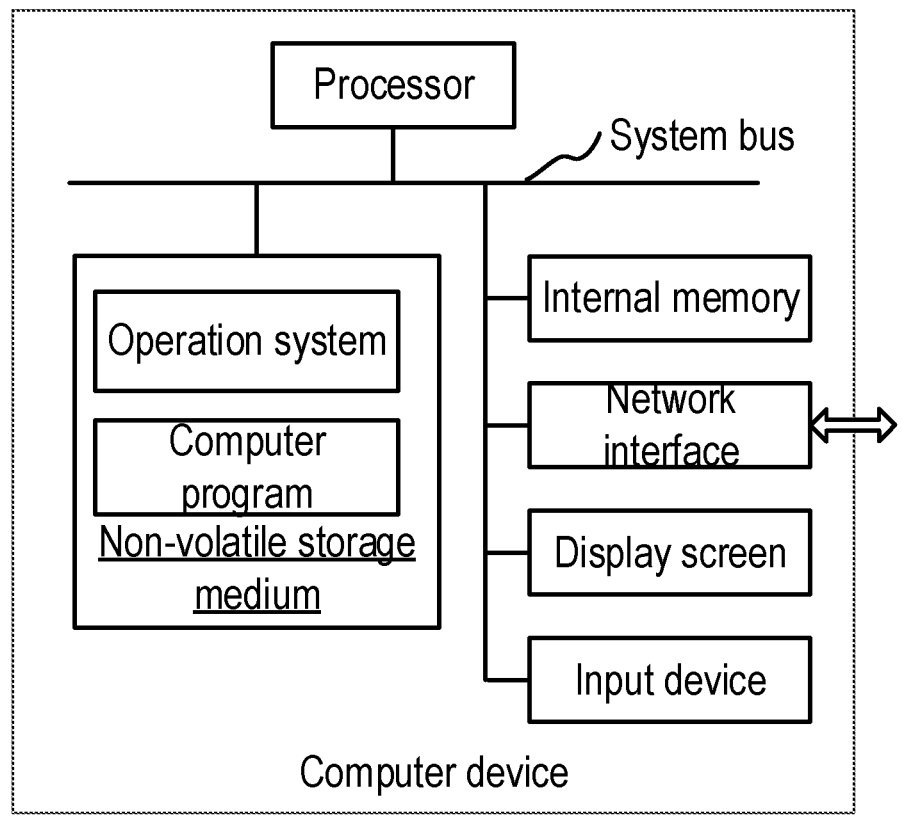
FIG. 31 is an internal structural diagram of a computer device according to an example of the present disclosure.

In an example, a computer equipment is provided. The computer equipment may be a terminal, and a diagram of the equipment's internal structure may be as shown in FIG. 31. The computer equipment includes a processor, a memory, a network interface, a display screen, and an input device connected through a system bus. The processor is configured to provide computing and control capabilities. The memory includes a non-volatile storage medium and an internal memory, where the non-volatile storage medium stores an operating system and a computer program, and the internal memory provides running environment for the operating system and the computer program stored in the non-volatile storage medium. The network interface is configured to communicate with an external terminal through a network connection. When the computer program is executed by the processor, a method for generating a general machine learning model file and/or a method for parsing a general machine learning model file are implemented. The display screen may be a liquid crystal display screen or an electronic ink display screen. The input device may be a touch layer covered on the display screen, or a button, a trackball, or a touchpad provided on the surface of the computer equipment, or an external keyboard, touchpad, or mouse.

Those skilled in the art may understand that the structure shown in FIG. 31 is only a block diagram of partial structure related to the solutions of the present disclosure, and is not considered as a limitation on the computer equipment to which the solutions of the present disclosure are applied. A specific computer equipment may include more or fewer components than shown in the figure, or combine certain components, or have a different arrangement of components.

An example of the present disclosure provides a computer device which includes a memory and a processor. A computer program is stored in the memory, and the processor implements the steps of the method provided in any of the above examples when executing the computer program.

The present disclosure provides a computer-readable storage medium on which a computer program is stored. When executed by a processor, the computer program implements the steps of the method provided in any of the above examples.

Those of ordinary skill in the art may understand that all or part of the processes in the methods of the above examples may be completed by instructing relevant hardware through a computer program, and the computer program may be stored in a non-volatile computer-readable storage medium. In this case, when the computer program is executed, the processes of the above method examples may be included. Any reference to the memory, storage, database, or other media used in the examples provided in this present disclosure may include non-volatile and/or volatile memory. The non-volatile memory may include a ROM (Read Only Memory), a PROM (Programmable ROM), an EPROM (Electrically PROM), an EEPROM (Electrically Erasable PROM), or a flash memory. The volatile memory may include a RAM (Random Access Memory) or an external scratchpad memory. By way of illustration, and rather than limitation, RAM can be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

Those skilled in the art may understand that the structure shown in FIG. 7 is only a block diagram of a partial structure related to the solution of the present disclosure, and does not constitute a limitation on the computer device to which the solution of the present disclosure is applied. The specific computer device may include more or fewer components than shown in the figures, or combine certain components, or have a different arrangement of components. Finally, it should be noted that the terms such as "first", "second", and the like in the present disclosure are only used for distinguishing between different objects or operations rather than describing a particular order. The terms "include" and "comprise" as well as variations thereof are intended to cover non-exclusive inclusion, so as to make a process, method, product, or device including a series of elements not only include the elements, but also include other elements that are not explicitly listed, or include other elements inherent to the process, method, product, or device.

The examples in this specification are described in a progressive manner. Each example focuses on its differences from other examples, while the same and similar parts between the examples can be referred to each other.

The above description of the disclosed examples enables those skilled in the art to implement or use this present disclosure. Various modifications to these examples will be apparent to those skilled in the art, and general principles defined herein can be implemented in other examples without departing from the spirit or scope of the present disclosure. Therefore, the present disclosure will not be limited to the examples shown herein, but should conform to the widest scope consistent with the principles and novel features disclosed in this present disclosure.

What is claimed:

1. A method for generating a general machine learning model, comprising:
    obtaining task parameters of a machine learning task;
    classifying the task parameters to obtain task instructions and model parameters, wherein the classifying the task parameters includes:
        obtaining attributes of input data, attributes of output data, and attributes of intermediate result temporary space of computation parameters,
        extracting a data amount of the input data from the attributes of the input data, and allocating storage space to the input data,
        extracting a data amount of the output data from the attributes of the output data, and allocating storage space to the output data,
        extracting a data amount of the intermediate result temporary space from the attributes of the intermediate result temporary space, and allocating storage space to the intermediate result temporary space, and
        storing the input data storage space and the output data storage space as heap data, and storing intermediate result temporary storage space as stack data;
    aggregating the task instructions and the model parameters according to data types to obtain the stack data and the heap data; and
    integrating the stack data and the heap data to obtain a general machine learning model, wherein the integrating the stack data and the heap data includes:

obtaining layout information of static data, layout information of dynamic data, and layout information of the stack data according to the task instructions, packaging and integrating task instruction heap data and model parameter static data according to the layout information of the static data to obtain successive static data blocks, packaging and integrating model parameter dynamic data according to the layout information of the dynamic data to obtain successive dynamic data blocks, packaging and integrating model parameter stack data according to the layout information of the stack data to obtain stack data blocks, and integrating the successive static data blocks, the successive dynamic data blocks, and the stack data blocks.

2. The method of claim 1,
wherein the task parameters include algorithm control parameters and computation parameters, and
wherein the classifying the task parameters to obtain the task instructions and the model parameters includes:
compiling the algorithm control parameters to obtain the task instructions, and
classifying the computation parameters to obtain the model parameters.

3. The method of claim 2, wherein the classifying the computation parameters to obtain the model parameters includes:
preprocessing the computation parameters to obtain preprocessed model data,
obtaining hardware parameters according to the computation parameters, and
extracting data attribute parameters in the computation parameters.

4. The method of claim 3, wherein the aggregating the task instructions and the model parameters according to the data types to obtain the stack data and the heap data includes:
classifying the task instructions to obtain task instruction heap data,
classifying the model parameters according to the data types to obtain model parameter stack data and model parameter heap data,
aggregating the model parameter stack data to obtain the stack data, and
aggregating the model parameter heap data and the task instruction heap data to obtain the heap data.

5. The method of claim 4, wherein the classifying the model parameters according to the data types to obtain the model parameter stack data and the model parameter heap data includes:
classifying the model parameters according to a shared attribute to obtain shareable model parameters and unshareable model parameters,
aggregating the shared model parameters to obtain the model parameter heap data, and
aggregating the unshareable model parameters to obtain the model parameter stack data.

6. The method of claim 4,
wherein the model parameter heap data includes model parameter static data and model parameter dynamic data, and
wherein the integrating the stack data and the heap data includes:

packaging and integrating the task instruction heap data and the model parameter static data to obtain successive static data blocks, packaging and integrating the model parameter dynamic data to obtain successive dynamic data blocks, packaging and integrating the model parameter stack data to obtain stack data blocks, and combining the successive static data blocks, the successive dynamic data blocks, and the stack data blocks to obtain the general machine learning model.

7. The method of claim 1, wherein the packaging and integrating the model parameter stack data according to the layout information of the stack data to obtain the stack data blocks includes:
integrating the unshareable model parameters and data of the intermediate result temporary space according to the layout information of the stack data to obtain the stack data blocks.

8. The method of claim 7,
wherein the obtaining the hardware parameters according to the computation parameters includes obtaining hardware platform information and hardware configuration parameters, and storing the hardware platform information and the hardware configuration parameters as the heap data, and
wherein the packaging and integrating the task instruction heap data and the model parameter static data includes integrating the task instruction heap data, the model parameter heap data, the hardware platform information, and the hardware configuration parameters according to the layout information of the static data to obtain the successive static data blocks.

9. The method of claim 1, wherein the packaging and integrating the model parameter dynamic data according to the layout information of the dynamic data to obtain the successive dynamic data blocks includes:
integrating the input data storage space and the output data storage space according to the layout information of the dynamic data to obtain the successive dynamic data blocks.

10. A device for generating a general machine learning model, the device comprising:
a central processing unit (CPU); and a memory;
an external interface module configured to obtain task parameters of a machine learning task;
a classification processing module configured to classify the task parameters to obtain task instructions and model parameters, wherein the classification processing module is further configured to:
obtain attributes of input data, attributes of output data, and attributes of intermediate result temporary space of computation parameters,
extract a data amount of the input data from the attributes of the input data, and allocating storage space to the input data,
extract a data amount of the output data from the attributes of the output data, and allocating storage space to the output data,
extract a data amount of the intermediate result temporary space from the attributes of the intermediate result temporary space, and allocate storage space to the intermediate result temporary space, and
store the input data storage space and the output data storage space as heap data, and store intermediate result temporary storage space as stack data;

a parameter aggregating module configured to aggregate the task instructions and the model parameters according to data types to obtain stack data and heap data; and a model generation module configured to integrate the stack data and the heap data to obtain a general machine learning model, wherein the model generation module is further configured to:

obtain layout information of static data, layout information of dynamic data, and layout information of the stack data according to the task instructions, package and integrate task instruction heap data and model parameter static data according to the layout information of the static data to obtain successive static data blocks, package and integrate model parameter dynamic data according to the layout information of the dynamic data to obtain successive dynamic data blocks, package and integrate model parameter stack data according to the layout information of the stack data to obtain stack data blocks, and integrate the successive static data blocks, the successive dynamic data blocks, and the stack data blocks.

11. The device of claim 10, wherein the task parameters include algorithm control parameters and computation parameters, and the classification processing module includes:

a task instruction generation module configured to compile the algorithm control parameters to obtain the task instructions, and a model parameter generation module configured to classify the computation parameters to obtain the model parameters.

12. The device of claim 11, wherein the model parameter generation module includes:

a model parameter stack data generation module configured to aggregate shareable model parameters to obtain model parameter stack data, and a model parameter heap data generation module configured to aggregate unshareable model parameters to obtain model parameter heap data.

13. The device of claim 12, wherein the model parameter heap data generation module includes:

a model parameter static data generation module configured to aggregate static model parameter heap data to obtain model parameter static data, and a model parameter dynamic data generation module configured to aggregate dynamic model parameter heap data to obtain model parameter dynamic data.

14. The device of claim 12, wherein the model parameter generation module further includes:

a preprocessing module configured to preprocess the computation parameters to obtain preprocessed model data, a hardware parameter generation module configured to obtain hardware parameters according to the computation parameters, and an attribute extraction module configured to extract data attribute parameters in the computation parameters.

15. The device of claim 10, wherein the model generation module is configured to combine the successive static data blocks, the successive dynamic data blocks, and the stack data blocks to obtain a general machine learning model.

* * * * *